US012705018B2

(12) United States Patent
You et al.

(10) Patent No.: US 12,705,018 B2
(45) Date of Patent: Aug. 11, 2026

(54) METHOD AND DEVICE FOR ADJUSTING VOLUME OF ELECTRONIC DEVICE

(71) Applicant: SAMSUNG ELECTRONICS CO., LTD., Suwon-si (KR)

(72) Inventors: Imkyeong You, Suwon-si (KR); Chanwoong Park, Suwon-si (KR); Jungkun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 18/816,448

(22) Filed: Aug. 27, 2024

(65) Prior Publication Data

US 2024/0419398 A1 Dec. 19, 2024

Related U.S. Application Data

(63) Continuation of application No. PCT/KR2023/001955, filed on Feb. 10, 2023.

(30) Foreign Application Priority Data

Feb. 28, 2022 (KR) ........................ 10-2022-0026189
Mar. 2, 2022 (KR) ........................ 10-2022-0027629

(51) Int. Cl.
*G06F 3/16* (2006.01)

(52) U.S. Cl.
CPC .................................... *G06F 3/165* (2013.01)

(58) Field of Classification Search
CPC ...................................................... G06F 3/165
See application file for complete search history.

(56) References Cited

U.S. PATENT DOCUMENTS 10,103,699 B2 * 10/2018 Weksler ............... H04R 29/001
2004/0096071 A1 5/2004 Wang (Continued)

FOREIGN PATENT DOCUMENTS

AU 2011296405 A1 * 4/2013 ............. G06F 3/165
KR 19980078297 A 11/1998

(Continued)

OTHER PUBLICATIONS

International Search Report for PCT/KR2023/001955 dated May 18, 2023, 4 pages.

(Continued)

*Primary Examiner* — Hai Phan
(74) *Attorney, Agent, or Firm* — Nixon & Vanderhye, P.C.

(57) ABSTRACT

A method for adjusting the volume of an electronic device, according to an embodiment, may comprise: adjusting, based on a user's voice being input into a first electronic device, the output volume of a second electronic device based on a second volume adjustment amount, determined based on the relative difference between the volume of the user's voice and the volume of the second electronic device measured in the first electronic device, and/or a third volume adjustment amount, input through a volume adjustment interface; adjusting, based on a conversation partner's voice being output from the first electronic device, the output volume of the first electronic device based on a first volume adjustment amount, determined based on the volume of the second electronic device measured in the first electronic device, and/or the third volume adjustment amount; and adjusting, based on the user and the conversation partner speaking simultaneously, the output volume of the second electronic device based on the first volume adjustment amount and/or the third volume adjustment amount, and (Continued)

determining the output volume of the first electronic device based on the volume of the user's voice.

16 Claims, 15 Drawing Sheets

(56) References Cited

U.S. PATENT DOCUMENTS

| | | | | |
|---|---|---|---|---|
| 2016/0103653 | A1* | 4/2016 | Jang | H03G 3/02 381/107 |
| 2016/0286328 | A1* | 9/2016 | Li | H04R 29/008 |
| 2021/0026592 | A1 | 1/2021 | Park et al. | |
| 2022/0239268 | A1* | 7/2022 | Dhiman | H04N 21/4852 |
| 2023/0344940 | A1* | 10/2023 | Deole | H04M 3/568 |

FOREIGN PATENT DOCUMENTS

| | | | | |
|---|---|---|---|---|
| KR | 20050063396 | A | 6/2005 | |
| KR | 20130072637 | A | 7/2013 | |
| KR | 101695840 | B1 | 1/2017 | |
| KR | 20180085931 | A | 7/2018 | |
| KR | 20180085939 | A | 7/2018 | |
| KR | 101956577 | B1 | 3/2019 | |
| KR | 20190096852 | A | 8/2019 | |
| KR | 20200024068 | A | 3/2020 | |
| WO | WO-2022025606 | A1 * | 2/2022 | G06F 3/0484 |

OTHER PUBLICATIONS

Written Opinion of the ISA for PCT/KR2023/001955 dated May 18, 2023, 3 pages.

* cited by examiner

METHOD AND DEVICE FOR ADJUSTING VOLUME OF ELECTRONIC DEVICE

CROSS-REFERENCE TO RELATED APPLICATIONS

This application is a continuation of International Application No. PCT/KR2023/001955 designating the United States, filed on Feb. 10, 2023, in the Korean Intellectual Property Receiving Office and claiming priority to Korean Patent Application Nos. 10-2022-0026189, filed on Feb. 28, 2022, and 10-2022-0027629, filed on Mar. 3, 2022, in the Korean Intellectual Property Office, the disclosures of each of which are incorporated by reference herein in their entireties.

BACKGROUND

Field

The disclosure relates to a method for adjusting the volume of an electronic device.

Description of Related Art

Recently, with the rapid advancement of portable terminal-related technology, portable terminals providing wireless voice calls and wireless video calls have become daily necessities. During the early days of portable terminals, portable terminals were simply perceived as portable devices that provided wireless calls. However, with the development of wireless Internet technology, the scope of using portable terminals has increased beyond simple phone calls or schedule management to include games, remote controls for controlling surrounding electronic devices using short-distance communication, or image capturing with digital cameras mounted therein.

As the scope of use widens, a user may perform a wireless video call using a portable terminal and may watch content output from another electronic device (e.g., a display device) at the same time. In this environment, when the user performs a call using the portable terminal, the actual call quality experienced by the user may vary significantly depending on the noise of surroundings other than the volume of other electronic devices around the user. For example, when the user performs a call in an environment where there is much ambient noise, or the volume of the other electronic devices is loud, the clarity of the voice signal decreases, and the user may feel the degradation of call quality.

Accordingly, there is a growing interest in technology for ensuring a smooth call without causing any disturbance for a user to watch content by measuring the volume around portable terminals.

While content is being played during a video call, when a call microphone is turned on, howling or sound occlusion may occur. To prevent and/or avoid this, a user may need to turn off the call microphone while watching content and may need to decrease the volume of the content and may need to turn on the call microphone every time the user has a conversation.

For example, when watching television while making a video call through a portable terminal, the user may put the portable terminal near them while watching the television from a distance of 2 m or more. Accordingly, when controlling the volume of the television, a change in volume measured in the portable terminal may need to be considered depending on the distance between the television and the portable terminal.

SUMMARY

Embodiments of the disclosure provide a method of adjusting the volume of an electronic device that may control content volume according to a video call situation when two or more electronic devices are connected to each other, one electronic device provides a video call function, and the other electronic device plays content.

Embodiments of the disclosure provide a method of adjusting the volume of an electronic device that may adjust the volume of another electronic device that plays content based on a relative difference between the volume of a user's voice and the volume of the other electronic device that is measured in the electronic device when the user speaks.

Embodiments of the disclosure provide a method of adjusting the volume of an electronic device that may adjust the volume of the electronic device that outputs a conversation partner's voice based on the volume of another electronic device that is measured in the electronic device when the conversation partner speaks.

Embodiments of the disclosure provide a method of adjusting the volume of an electronic device that may adjust the volume of another electronic device that plays content based on a relative difference between the volume of a user's voice and the volume of the other electronic device that is measured in the electronic device and may adjust the volume of the electronic device that outputs a conversation partner's voice based on the volume of the user's voice when the user and the conversation partner speak at the same time.

According to an example embodiment, a method of adjusting a volume of an electronic device includes: based on a user's voice being input to a first electronic device, adjusting an output volume of a second electronic device, based on at least one of a second volume adjustment amount and a third volume adjustment amount, in which the second volume adjustment amount is determined based on a relative difference between a volume of the user's voice that is input and a volume of the second electronic device measured in the first electronic device, and the third volume adjustment amount is input through a volume adjustment interface, based on a conversation partner's voice being output from the first electronic device, adjusting an output volume of the first electronic device based on at least one of a first volume adjustment amount and the third volume adjustment amount, wherein the first volume adjustment amount is determined based on the volume of the second electronic device measured in the first electronic device, and, based on the user and the conversation partner speaking at the same time, adjusting the output volume of the second electronic device based on at least one of the first volume adjustment amount and the third volume adjustment amount and determining the output volume of the first electronic device based on the volume of the user's voice.

According to an example embodiment, a device for adjusting a volume of an electronic device includes: at least one processor, comprising processing circuitry, and a memory, wherein at least one processor, individually and/or collectively, is configured to: based on a user's voice being input to a first electronic device, adjust an output volume of a second electronic device, based on at least one of a second volume adjustment amount and a third volume adjustment amount, in which the second volume adjustment amount is determined based on a relative difference between a volume of the user's voice that is input and a volume of the second electronic device measured in the first electronic device, and the third volume adjustment amount is input through a volume adjustment interface, based on a conversation partner's voice being output from the first electronic device, adjust an output volume of the first electronic device based on at least one of a first volume adjustment amount and the third volume adjustment amount, wherein the first volume adjustment amount is determined based on the volume of the second electronic device measured in the first electronic device, and, based on the user and the conversation partner speaking at the same time, adjust the output volume of the second electronic device based on at least one of the first volume adjustment amount and the third volume adjustment amount and determining the output volume of the first electronic device based on the volume of the user's voice.

According to an example embodiment, a method of adjusting the volume of an electronic device may resolve the inconvenience of manually adjusting the volume of an electronic device that plays content every time a user makes a video call.

According to an example embodiment, a method of adjusting the volume of an electronic device may resolve the inconvenience of reducing a volume by finding and controlling a remote control or going to the position of an electronic device that plays content to decrease the volume of the electronic device that plays content when making a video call.

According to an example embodiment, a method of adjusting the volume of an electronic device may determine a volume that a user may comfortably listen to depending on a situation by relatively adjusting the volume of a portable terminal and the volume of an electronic device that plays content.

According to an example embodiment, a method of adjusting the volume of an electronic device may increase awareness of what a conversation partner speaks about despite ambient noise by displaying the conversation partner's speaking state and spoken content on a display when the conversation partner speaks.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
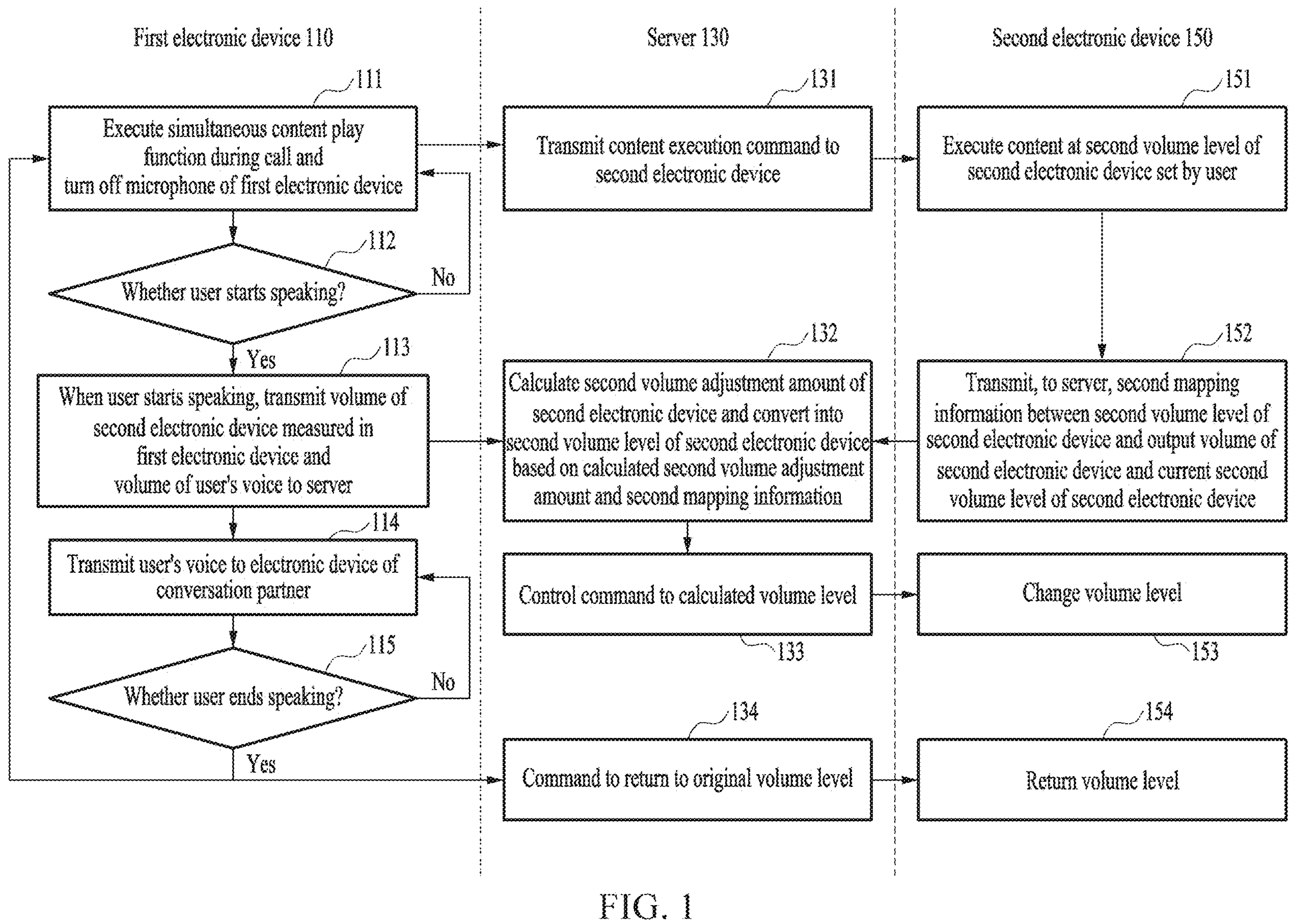
FIG. 1 is a flowchart illustrating an example operation of adjusting an output volume of a second electronic device when a user speaks, according to various embodiments.

The following descriptions of examples of the present disclosure are merely intended for the purpose of describing the examples and the examples may be implemented in various forms. The examples are not intended to be limiting, but it is intended that various modifications, equivalents, and alternatives are also covered within the scope of the disclosure.

Although terms of "first" or "second" are used to explain various components, the components are not limited to the terms. These terms are used simply to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this disclosure, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The electronic devices according to various embodiments may be various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic devices are not limited to those described above.

Hereinafter, various examples are described in greater detail with reference to the accompanying drawings. In the drawings, like reference numerals are used for like elements.

FIG. 1 is a flowchart illustrating an example operation of adjusting an output volume of a second electronic device when a user speaks, according to various embodiments.

FIG. 1 illustrates a first electronic device 110, a server 130, and a second electronic device 150. According to an embodiment, the first electronic device 110 may be different from the second electronic device 150. For example, the first electronic device 110 may include an electronic device that provides a user with a call function (e.g., a voice call or a video call). For another example, the second electronic device 150 may include an electronic device that plays content (e.g., video, music, image, text, etc.). According to an embodiment, the server 130 may be connected to the first electronic device 110 and the second electronic device 150 and may transmit and receive signals. According to an embodiment, the server 130 may be a home server installed in the user's home or may be an external server (e.g., a server operated by a company) outside the home. According to an embodiment, the first electronic device 110 and the second electronic device 150 may be connected to each other and may transmit and receive signals.

According to an embodiment, the first electronic device 110 may execute a simultaneous content play function during a call. According to an embodiment, the simultaneous content play function during a call may include a function that enables the user and a conversation partner to watch the same content during a call. For example, content that the user is watching through the second electronic device 150 (e.g., a television, a tablet, etc.) may be the same as content that the conversation partner is watching through another second electronic device different from the user's second electronic device 150.

According to an embodiment, the server 130 may receive a signal related to the execution of the simultaneous content play function from the first electronic device 110. In this case, the server may transmit, in operation 131, a content execution command to the second electronic device 150. According to an embodiment, the second electronic device 150 may execute, in operation 151, content at a second volume level of the second electronic device set by the user. The second volume level is described in greater detail below.

According to an embodiment, the second electronic device 150 may transmit, in operation 152, to the server 130, second mapping information between the second volume level of the second electronic device 150 and an output volume of the second electronic device 150 and the current second volume level of the second electronic device. The second mapping information is described in greater detail below. According to an embodiment, the current second volume level of the second electronic device may refer to a volume level corresponding to a current output volume of the second electronic device. For example, when the current output volume of the second electronic device is 39 dB and the second volume level corresponding to 39 dB is 10, the current second volume level of the second electronic device may be 10. The second mapping information may include the information on the second volume level corresponding to an output volume of a second electronic device.

According to an embodiment, when the user does not speak, the first electronic device 110 may control a microphone of the first electronic device 110 to be turned off in operation 111. According to an embodiment, if the microphone is turned on even when the user does not speak, the sound of the content that is output from a second electronic device may be input to the microphone, and the sound of the content may be transmitted to the conversation partner. In this case, the conversation partner hears the same content once through each different electronic device, which disturbs listening to the content.

According to an embodiment, the first electronic device 110 may determine whether the user starts speaking in operation 112. When the user does not start speaking, the microphone of the first electronic device 110 may remain turned off.

According to an embodiment, at the time when the user starts speaking, the volume of the second electronic device 150 measured in the first electronic device 110 and the volume of the user's voice may be transmitted, in operation 113, to the server 130. According to an embodiment, the volume of the second electronic device 150 felt by the user may vary depending on a distance between the second electronic device 150 and the user. For example, as the distance between the second electronic device 150 and the user increases, the volume of the second electronic device 150 felt by the user may decrease. Thus, to determine whether the volume of the second electronic device 150 disturbs a call, the user may adjust the output volume of the second electronic device 150 based on the volume of the second electronic device 150 felt by the user. Accordingly, the server 130 may adjust the output volume of the second electronic device 150 based on the volume of the second electronic device 150 measured in the first electronic device 110 near the user. According to an embodiment, the volume of the user's voice may include the volume of voice uttered by the user.

According to an embodiment, the server 130 may determine that the first electronic device 110 and the second electronic device 150 are within a predetermined distance. The first electronic device 110 and the second electronic device 150 may need to be in the same space. This is because the first electronic device 110 needs to be adjacent to the second electronic device 150 such that the user may watch content through the second electronic device 150 while making a call through the first electronic device 110. Accordingly, the server 130 may determine whether the first electronic device 110 is adjacent to the second electronic device 150 through Internet-of-things (IoT) technology. For another example, the server 130 may determine adjacency based on position information of the first electronic device 110 and position information of the second electronic device 150.

According to an embodiment, the first electronic device 110 may use voice recognition technology to recognize the user's utterance. For example, the first electronic device 110 may recognize the user's utterance based on voice feature information (e.g., tone, accent, timbre, pitch, etc.) for identifying the user's voice. According to an embodiment, the first electronic device 110 may recognize the user's utterance through an input through another electronic device. For example, the user may input the user's voice by pressing a certain button (e.g., a microphone button) included in a remote control. For another example, the user may input the user's voice by touching or pressing an object (e.g., a microphone object) displayed on a display of the first electronic device 110.

According to an embodiment, the server 130 may calculate a second volume adjustment amount of the second electronic device 150 and may convert, in operation 132, the output volume of the second electronic device 150 determined based on the calculated second volume adjustment amount and the second mapping information into the second volume level of the second electronic device 150. For example, the volume of the second electronic device 150 measured in the first electronic device 110 may be 60 dB, and the server 130 may adjust the volume of the second electronic device 150 measured in the first electronic device 110 to decrease to 40 dB. In this case, the second volume adjustment amount may be −20 dB. According to an embodiment, the second mapping information may include mapping information between the second volume level of the second electronic device 150 and the output volume of the second electronic device 150. For example, the second volume level=5 may be mapped to the output volume=25 dB, the second volume level=10 may be mapped to the output volume=39 dB, the second volume level=11 may be mapped to the output volume=41 dB, the second volume level=12 may be mapped to the output volume=42 dB, and the second volume level=15 may be mapped to the output volume=45 dB. For example, the output volume of the second electronic device 150 is 45 dB now, the server 130 may control the second electronic device 150 to decrease the output volume of the second electronic device 150 to 25 dB based on the second volume adjustment amount (e.g., −20 dB). In this case, the server 130 may transmit the second volume level=5 mapped to the output volume=25 dB as a control signal to the second electronic device 150.

According to an embodiment, the server 130 may determine the second volume adjustment amount based on ambient noise measured in the first electronic device 110 and the volume of the user's voice. According to an embodiment, the ambient noise may include every sound that is input to the first electronic device 110, excluding the user's voice. For example, the ambient noise may include living noise around the user other than the sound of a second electronic device measured in a first electronic device. The living noise may include, for example, the sound of dishwashing, the sound of cars passing outside a house, the sound of people chattering, or the like. Accordingly, the server 130 may adjust the output volume of the second electronic device 150 based on a relative difference between ambient noise measured in the first electronic device 110 and the volume of the user's voice.

According to an embodiment, the first electronic device 110 may receive the voice information of content being played from the second electronic device 150 to identify a voice that is output from the second electronic device 150 among input sounds. Accordingly, the first electronic device 110, based on the voice information of content, may identify a voice that is output from a second electronic device from ambient noise and may accurately measure the volume of the voice.

According to an embodiment, the server 130 may determine the second volume adjustment amount based on a relative difference between the volume of the user's voice and the volume of the second electronic device 150 measured in the first electronic device 110. According to an embodiment, the second volume adjustment amount may be determined based on a difference between the output volume (e.g., a current output volume) of a second electronic device at a certain time and a target output volume. The operation of adjusting an output volume of a second electronic device based on the second volume adjustment amount is described in greater detail below with reference to FIGS. 3A and 3B.

According to an embodiment, the server 130 may transmit, in operation 133, a control command to a calculated volume level to the second electronic device 150. According to an embodiment, the server 130 may transmit a control command based on the calculated second volume adjustment amount to the second electronic device 150. In this case, the second electronic device 150 may adjust the output volume of the second electronic device 150 after converting the output volume of the second electronic device 150 determined based on the calculated second volume adjustment amount and the second mapping information into the second volume level.

According to an embodiment, the second electronic device 150 may change, in operation 153, a volume level by receiving a control command from the server 130. For example, when a current volume level of the second electronic device 150 is 10, and a volume level calculated in the server 130 is 5, the second electronic device 150 may adjust the volume level from 10 to 5.

According to an embodiment, the first electronic device 110 may transmit, in operation 114, the user's voice to the conversation partner's electronic device. In this case, the microphone of the first electronic device 110 may be turned on. Accordingly, the first electronic device 110 may receive the user's voice.

According to an embodiment, the first electronic device 110 may determine whether the user stops speaking in operation 115. According to an embodiment, when the user stops speaking, the first electronic device 110 may transmit a signal that notifies the end of the user's speech to the server 130. In this case, the server 130 may transmit a command 134 to return to an original volume level to the second electronic device 150. The second electronic device 150 that receives such a command may adjust the output volume by returning, in operation 154, the volume level.

According to an embodiment, the user's voice may be clearly transmitted to the conversation partner by adjusting the output volume of the second electronic device 150 based on a relative difference between the volume of the user's voice and the volume of the second electronic device 150 measured in the first electronic device 110. By doing so, the conversation partner may clearly receive the user's voice without being disturbed by the sound that is output from the second electronic device. Accordingly, call quality that enables the user and the conversation partner to communicate while watching content may be assured.

Figure 2:
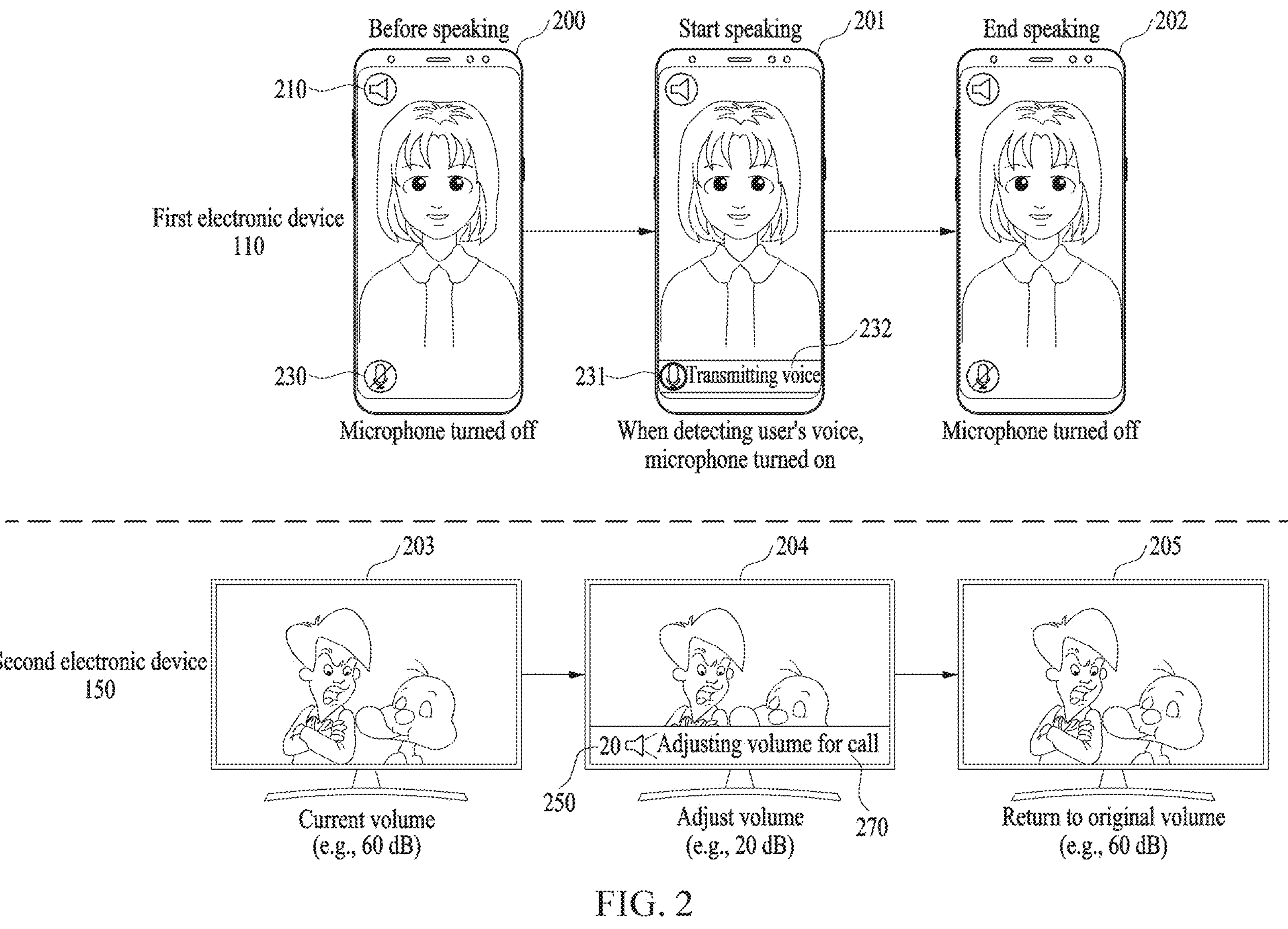
FIG. 2 is a diagram illustrating a screen of a first electronic device and a screen of a second electronic device when a user speaks, according to various embodiments.

FIG. 2 is a diagram illustrating examples of a screen of a first electronic device and a screen of a second electronic device when a user speaks, according to various embodiments.

FIG. 2 illustrates a screen 200 of the first electronic device 110 before the user speaks, a screen 201 of the first electronic device 110 when the user starts speaking, a screen 202 of the first electronic device 110 after the user stops speaking, a screen 203 of the second electronic device 150 before the user speaks, a screen 204 of the second electronic device 150 when the user starts speaking, a screen 205 of the second electronic device 150 after the user stops speaking, a volume object 210, a voice transmission off object 230, a voice transmission on object 231, a first call object 232, an output volume display object 250, and a volume adjustment display object 270.

According to an embodiment, a conversation partner in a video call may be displayed on the screen 200 of the first electronic device 110 before the user speaks. The volume object 210 and the voice transmission off object 230 may be displayed on a screen of the first electronic device 110. According to an embodiment, since the user's voice is not transmitted to the conversation partner before the user speaks, the voice transmission off object 230 may be displayed. According to an embodiment, the volume object 210 may include an object for adjusting a volume through a volume adjustment interface. For example, when the first electronic device 110 receives an input of selecting the volume object 210 from the user, the first electronic device 110 may output the volume adjustment interface on the screen. According to an embodiment, content that is played may be displayed on the screen 203 of the second electronic device 150 before the user speaks. In addition, the output volume of the second electronic device 150 before the user speaks may be 60 dB.

According to an embodiment, when the user starts speaking, the screen of the first electronic device 110 may be displayed as the screen 201 of the first electronic device 110 when the user starts speaking. According to an embodiment, the volume object 210, the voice transmission on object 231, and/or the first call object 232 may be displayed on the screen 201 of the first electronic device 110 when the user starts speaking. According to an embodiment, to transmit the user's voice, the voice transmission on object 231 may include an object for displaying whether the microphone of the first electronic device 110 is on. According to an embodiment, the first call object 232 may include an object for displaying that the user's voice is now being transmitted to the conversation partner. For example, when the user's voice is now being transmitted to the conversation partner, the first call object 232 may include text "transmitting voice". According to an embodiment, the output volume of the second electronic device 150 may be adjusted when the user starts speaking. In this case, a screen of the second electronic device 150 may include an object for displaying that the output volume is adjusted. According to an embodiment, the screen 204 of the second electronic device 150 when the user starts speaking may include a screen for displaying that the user's voice is transmitted to the conversation partner as the user starts speaking and the output volume of the second electronic device 150 is adjusted. For example, the output volume of the second electronic device 150 before the user starts speaking may be 60 dB. However, as the user starts speaking, the output volume of the second electronic device 150 may be adjusted to 20 dB. In this case, the screen 204 of the second electronic device 150 when the user starts speaking may include the output volume display object 250 and/or the volume adjustment display object 270. According to an embodiment, the output volume display object 250 may include an object for adjusting the output volume of the second electronic device 150. For example, when an output volume of a second electronic device is 20 dB, the output volume display object 250 may be 20. For another example, when the output volume of the second electronic device is 20 dB, and a second volume level corresponding to the output volume of 20 dB is 5, the output volume display object 250 may be 5. According to an embodiment, the output adjustment display object 270 may include an object that the output volume of the second electronic device 150 is adjusted as the user starts speaking. For example, the volume adjustment display object 270 may be an object for displaying "adjusting volume for a call".

According to an embodiment, the screen 202 of the first electronic device 110 after the user stops speaking may include the screen of the first electronic device 110 after the user stops speaking. In this case, the voice transmission off object 230 may be displayed on the screen. According to an embodiment, the volume adjustment display object 270 may not be displayed on the screen 205 of the second electronic device 150 after the user stops speaking, unlike when the user is speaking. In addition, as the user's speech ends, the output volume of the second electronic device 150 may return to the original volume.

Figure 3A:
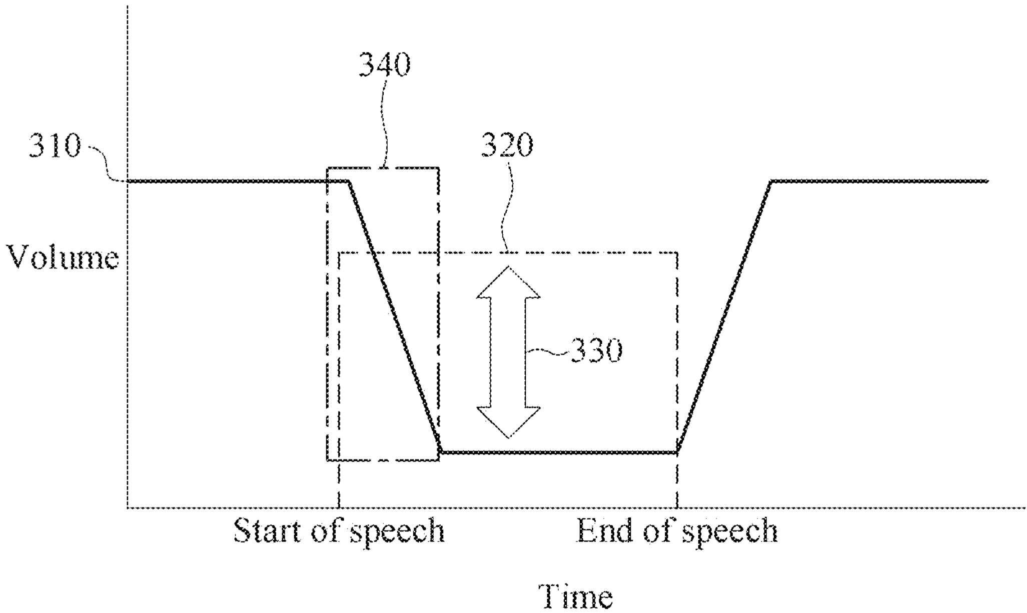
FIGS. 3A and 3B are diagrams including graphs illustrating an example method of adjusting an output volume of a second electronic device based on the volume of a user's voice and the volume of the second electronic device that is measured in a first electronic device when the user speaks, according to various embodiments.
Figure 3B:
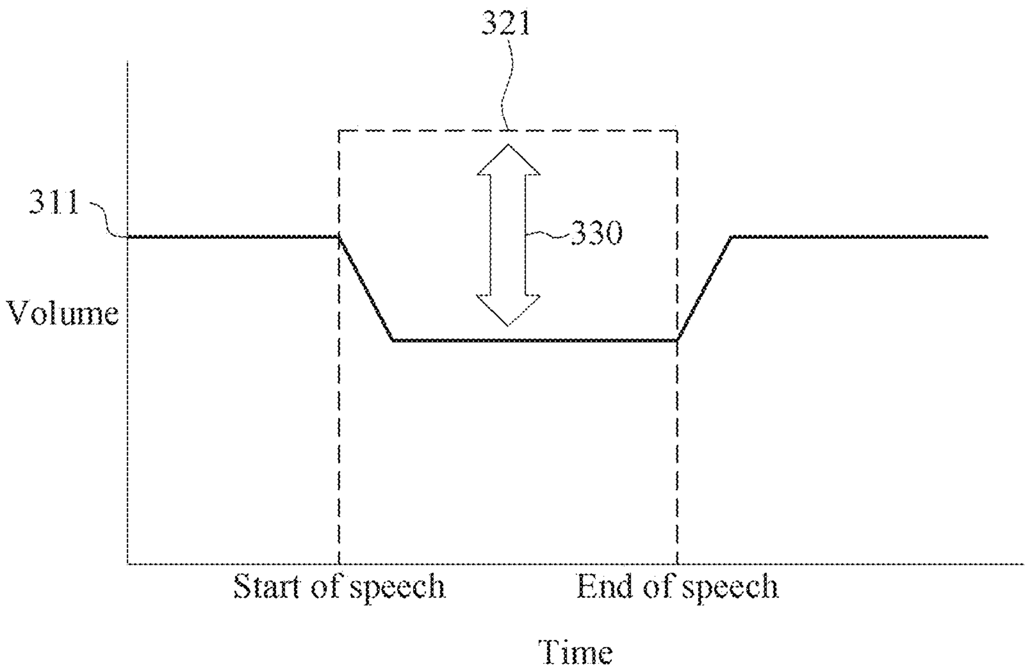

FIGS. 3A and 3B are diagrams including graphs illustrating an example method of adjusting an output volume of a second electronic device based on the volume of a user's voice and the volume of the second electronic device that is measured in a first electronic device when the user speaks, according to various embodiments.

According to an embodiment, the second electronic device 150 and/or the server 130 may adjust the output volume of the second electronic device 150 such that the output volume of the second electronic device does not disturb the clear transmission of the user's voice to a conversation partner. According to an embodiment, the second electronic device 150 may adjust the output volume by receiving a command signal from the server 130. According to an embodiment, the second electronic device 150 may adjust the output volume by receiving a command signal from the first electronic device 110. According to an embodiment, the second electronic device 150 may determine a second volume adjustment amount by receiving the volume of the second electronic device 150 measured in the first electronic device 110 and the volume of the user's voice from the first electronic device 110.

The method of adjusting the output volume of the second electronic device 150 when the volume of the second electronic device 150 measured in the first electronic device 110 is greater than the volume of the user's voice is described in greater detail with reference to FIG. 3A. The method of adjusting the output volume of the second electronic device 150 when the volume of the second electronic device 150 measured in the first electronic device 110 is less than the volume of the user's voice is described in greater detail with reference to FIG. 3B.

FIG. 3A illustrates a volume 310 of the second electronic device 150 measured in the first electronic device 110, a volume 320 of the user's voice, a first predetermined volume 330, and a fade section 340.

According to an embodiment, the server 130 may adjust the output volume of the second electronic device based on a relative difference between the output volume of the second electronic device 150 and the volume of the second electronic device 150 measured in the first electronic device 110.

According to an embodiment, when the volume of the user's voice that is input is less than the volume of the second electronic device 150 measured in the first electronic device 110, the server 130 may adjust the output volume of the second electronic device 150 to be less than or equal to a value obtained by subtracting the first predetermined volume 330 from the volume of the user's voice that is input. For example, as illustrated in FIG. 3A, before the start of speech, the volume of the second electronic device 150 measured in the first electronic device 110 may be greater than the volume of the user's voice. In this case, the server 130 may adjust the volume of the second electronic device 150 measured in the first electronic device 110 to be less than a value obtained by subtracting the first predetermined volume 330 from the volume of the user's voice. For example, when the volume of the user's voice is 50 dB, and the first predetermined volume 330 is 15 dB, the server 130 may adjust the output volume of the second electronic device 150 such that the volume 310 of the second electronic device 150 measured in the first electronic device 110 may be less than or equal to 35 dB. According to an embodiment, the first predetermined volume 330 may be determined based on a difference between a target sound and a background sound to the extent that the target sound (e.g., the user's voice) may be clearly transmitted to the conversation partner where there is the background sound (e.g., the output volume of the second electronic device 150 or ambient noise). For example, when the difference between the target sound and the background sound is 15 dB, the conversation partner may comfortably hear the target sound despite the background sound.

According to an embodiment, the fade section 340 may include a section where the output volume of the second electronic device 150 gradually changes. According to an embodiment, when the output volume of the second electronic device 150 significantly changes, the user's call may be disturbed or the user's concentration on content may decrease. Accordingly, by gradually changing the output volume of the second electronic device 150, an environment where the user may comfortably make a call while focusing on content may be provided.

FIG. 3B illustrates the volume 311 of the second electronic device 150 measured in the first electronic device 110, a volume 321 of the user's voice, and the first predetermined volume 330.

Hereinafter, the method of adjusting the output volume of the second electronic device 150 when the volume of the user's voice is greater than the volume of the second electronic device 150 measured in the first electronic device 110 is described in greater detail.

According to an embodiment, when the volume of the user's voice that is input is less than a value obtained by adding the first predetermined volume 330 to the volume of the second electronic device 150 measured in the first electronic device 110, the server 130 may adjust the output volume of the second electronic device 150 such that the volume of the second electronic device 150 measured in the first electronic device 110 is less than a value obtained by subtracting the first predetermined volume 330 from the volume of the user's voice that is input. For example, there may be the volume of the second electronic device 150 measured in the first electronic device 110+the first predetermined volume 330>the volume of the user's voice>the volume of the second electronic device 150 measured in the first electronic device 110. In this case, for example, the server 130 may adjust the output volume of the second electronic device 150 such that the volume of the second electronic device 150 measured in the first electronic device 110<=the volume of the user's voice−the first predetermined volume 330.

According to an embodiment, when the volume of the user's voice that is input is greater than a value obtained by adding the first predetermined volume 330 to the volume of the second electronic device 150 measured in the first electronic device 110, the server 130 may maintain the output volume of the second electronic device 150.

For example, there may be the volume of the second electronic device 150 measured in the first electronic device 110+the first predetermined volume 330<=the volume of the user's voice. In this case, for example, the server 130 may maintain the output volume of the second electronic device 150. This is because the user's voice may be clearly transmitted to the conversation partner without being disturbed by the output volume of the second electronic device since a difference between the volume of the user's voice and the volume of the second electronic device 150 measured in the first electronic device 110 is greater than the first predetermined volume 330 (e.g., 15 dB).

Figure 4:
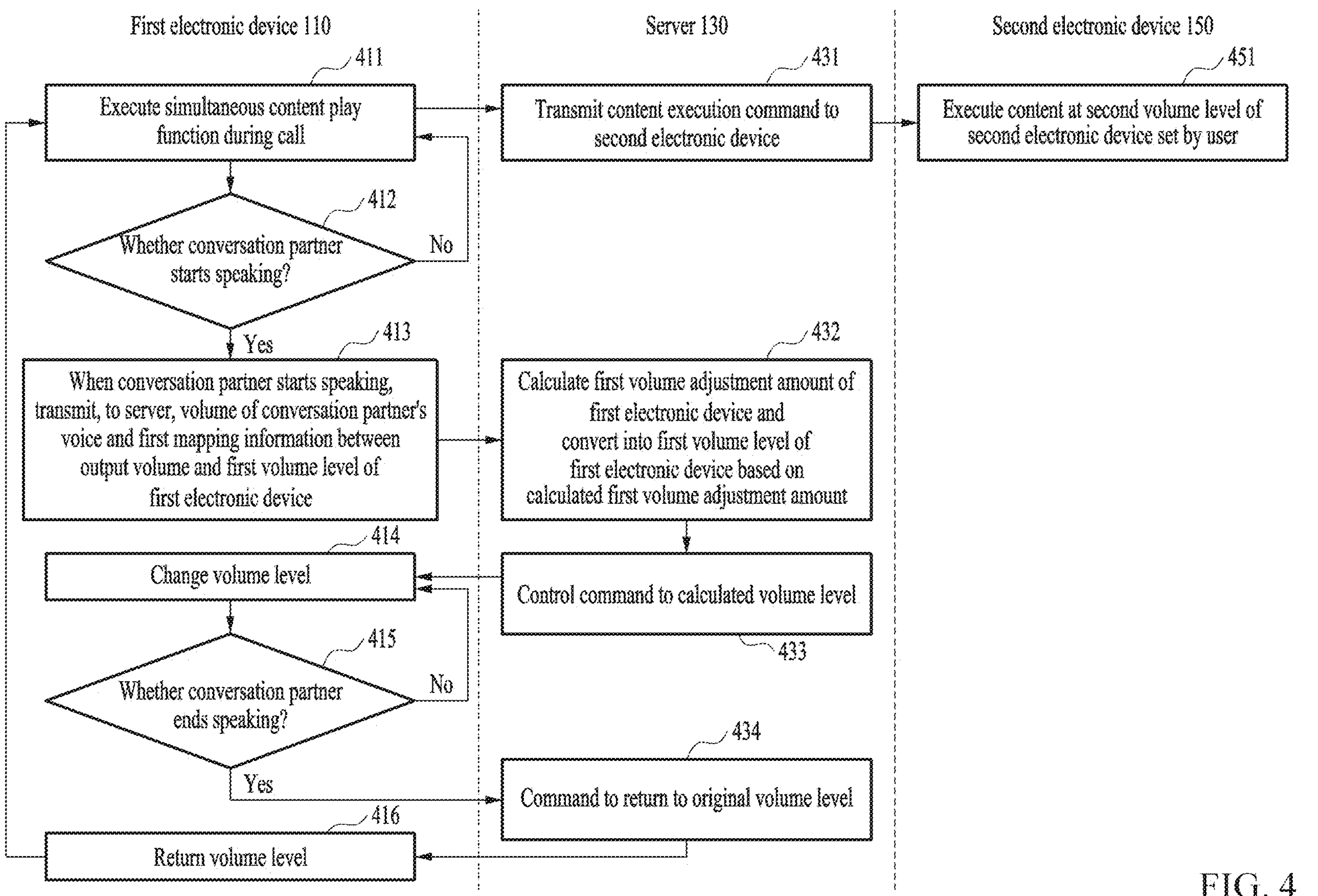
FIG. 4 is a flowchart illustrating an example operation of adjusting an output volume of a first electronic device when a conversation partner speaks, according to various embodiments.

FIG. 4 is a flowchart illustrating an example operation of adjusting an output volume of a first electronic device when a conversation partner speaks, according to various embodiments.

According to an embodiment, the first electronic device 110 may execute, in operation 411, a simultaneous content play function during a call. According to an embodiment, the server 130 may receive a signal related to the execution of the simultaneous content play function from the first electronic device 110. In this case, the server may transmit, in operation 431, a content execution command to the second electronic device 150. According to an embodiment, the second electronic device 150 may execute, in operation 451, content at a second volume level of the second electronic device set by the user.

According to an embodiment, the first electronic device 110 may determine whether the conversation partner starts speaking in operation 412. For example, when receiving a voice signal from the conversation partner's electronic device, the first electronic device 110 may recognize that the conversation partner has started speaking. According to an embodiment, when the conversation partner starts speaking, the first electronic device 110 may perform the operations below.

According to an embodiment, when the conversation partner starts speaking, the first electronic device 110 may transmit, in operation 413, to a server, the volume of the conversation partner's voice and first mapping information between an output volume and a first volume level of the first electronic device 110. According to an embodiment, the first mapping information may include mapping information between the first volume level of the first electronic device 110 and the output volume of the first electronic device 110. For example, the first volume level=3 may be mapped to the output volume=25 dB, the first volume level=5 may be mapped to the output volume=39 dB, the first volume level=6 may be mapped to the output volume=41 dB, the first volume level=7 may be mapped to the output volume=42 dB, and the first volume level=10 may be mapped to the output volume=45 dB.

According to an embodiment, the server 130 may calculate a first volume adjustment amount of the first electronic device 110 and may convert, in operation 432, the output volume of the first electronic device 110 determined based on the calculated first volume adjustment amount into the first volume level of the first electronic device 110. According to an embodiment, the server 130 may determine the first volume adjustment amount of the first electronic device based on the volume of a second electronic device measured in the first electronic device. According to an embodiment, the first volume adjustment amount may be determined based on a difference between the output volume of the first electronic device at a certain time and a target output volume. The operation of adjusting the output volume of the first electronic device based on the first volume adjustment amount is described in greater detail below with reference to FIGS. 6A to 6C.

According to an embodiment, the output volume of the first electronic device 110 is 45 dB now, and the target output volume is 39 dB, the server 130 may control the first electronic device 110 to decrease the output volume of the first electronic device 110 to 39 dB based on the first volume adjustment amount (e.g., −6 dB). According to an embodiment, the server 130 may transmit, in operation 433, a control command to the calculated volume level to the first electronic device 110. In this case, the server 130 may transmit the first volume level=5 mapped to the output volume=39 dB as a command to the first electronic device 110. According to an embodiment, the first electronic device 110 may change, in operation 414, a volume level by receiving the command.

According to an embodiment, the first electronic device 110 may determine whether the conversation partner stops speaking in operation 415. According to an embodiment, when the conversation partner stops speaking, the first electronic device 110 may transmit a signal that notifies the end of the conversation partner's speech to the server 130. In this case, the server 130 may transmit a command 434 to return to an original volume level 416 to the first electronic device 110. The first electronic device 110 that receives such a command may adjust the output volume by returning, in operation 454, the volume level.

Figure 5:
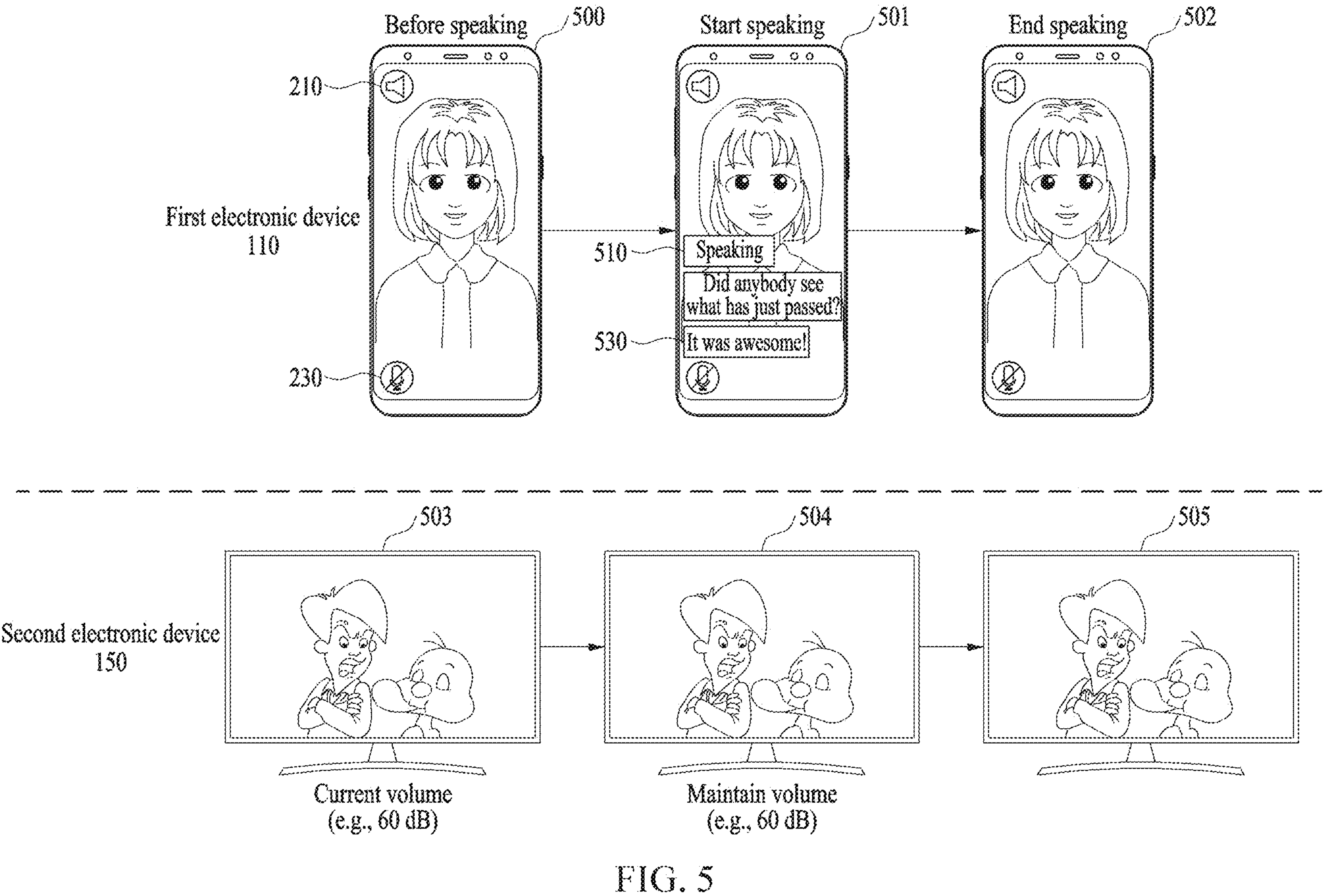
FIG. 5 is a diagram illustrating a screen of a first electronic device and a screen of a second electronic device when a conversation partner speaks, according to various embodiments.

FIG. 5 is a diagram illustrating examples of a screen of a first electronic device and a screen of a second electronic device when a conversation partner speaks, according to various embodiments.

FIG. 5 illustrates a screen 500 of the first electronic device 110 before the conversation partner speaks, a screen 501 of the first electronic device 110 when the conversation partner starts speaking, a screen 502 of the first electronic device 110 after the conversation partner stops speaking, a screen 503 of the second electronic device 150 before the conversation partner speaks, a screen 504 of the second electronic device 150 when the conversation partner starts speaking, a screen 505 of the second electronic device 150 after the conversation partner stops speaking, the volume object 210, the voice transmission off object 230, a second call object 510, and a third call object 530.

According to an embodiment, the conversation partner in a video call may be displayed on the screen 500 of the first electronic device 110 before the conversation partner speaks. In this case, the volume object 210 and the voice transmission off object 230 may be displayed on the screen of the first electronic device 110. According to an embodiment, content may be played on the screen 503 of the second electronic device 150 before the conversation partner speaks. For example, the output volume of the second electronic device 150 before the conversation partner speaks may be 60 dB.

According to an embodiment, the screen 501 of the first electronic device 110 when the conversation partner starts speaking may include the second call object 510 and/or the third call object 530. According to an embodiment, the second call object 510 may be an object for displaying that the conversation partner is now speaking. For example, the second call object 510 may be displayed as "speaking". According to an embodiment, the third call object 530 may include an object for displaying the conversation partner's voice in a text form. For example, when the conversation partner says "Did anybody see what just happened? It was awesome!", the third call object 530 may display text saying "Did anybody see what just happened? It was awesome!". By doing so, even in an environment where there is ambient noise other than an output volume of the second electronic device 150, a user may know what the conversation partner says, and thus, the user may have smooth communication with the conversation partner. According to an embodiment, the screen 504 of the second electronic device 150 when the conversation partner starts speaking may include the screen of the conversation partner starting speaking. In this case, the output volume (e.g., 60 dB) of the second electronic device 150 before the conversation partner starts speaking may be the same as the output volume (e.g., 60 dB) of the second electronic device 150 after the conversation partner starts speaking. According to an embodiment, the server 130 may maintain the output volume of the second electronic device 150 in order not to disturb the user's concentration on content. Accordingly, unlike when the user speaks, the output volume of the second electronic device 150 is maintained, and thus, an object notifying that a volume is automatically adjusted depending on speech may not need to be displayed on the screen of the second electronic device 150.

According to an embodiment, the screen 502 of the first electronic device 110 after the user stops speaking may include the screen of the first electronic device 110 after the conversation partner stops speaking. According to an embodiment, the screen 502 of the second electronic device 150 after the user stops speaking may include the screen of content being played.

Figure 6A:
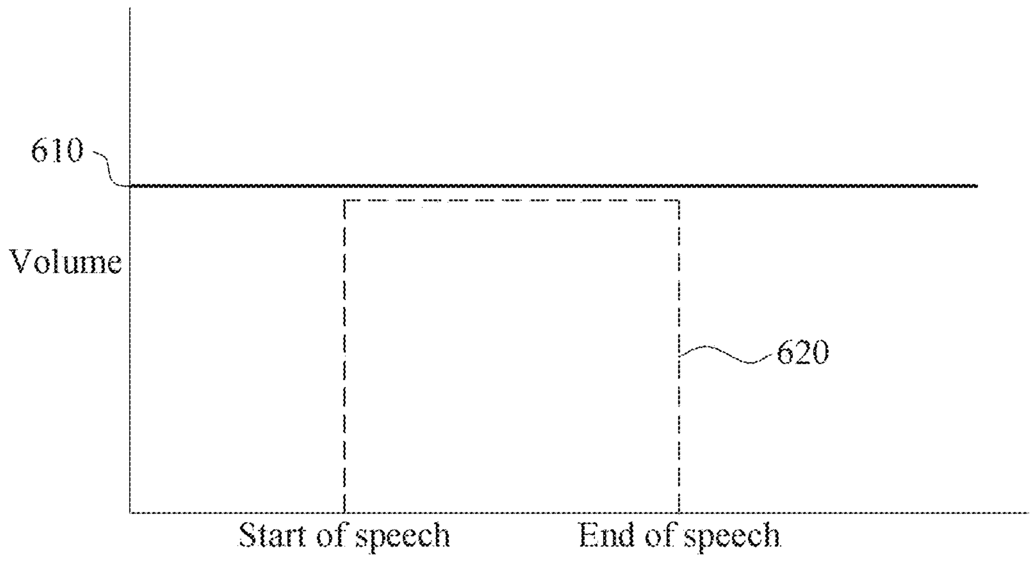
FIGS. 6A, 6B and 6C are diagrams including graphs illustrating an example method of adjusting an output volume of a first electronic device based on the volume of the second electronic device that is measured in a first electronic device when a conversation partner speaks, according to various embodiments.
Figure 6B:
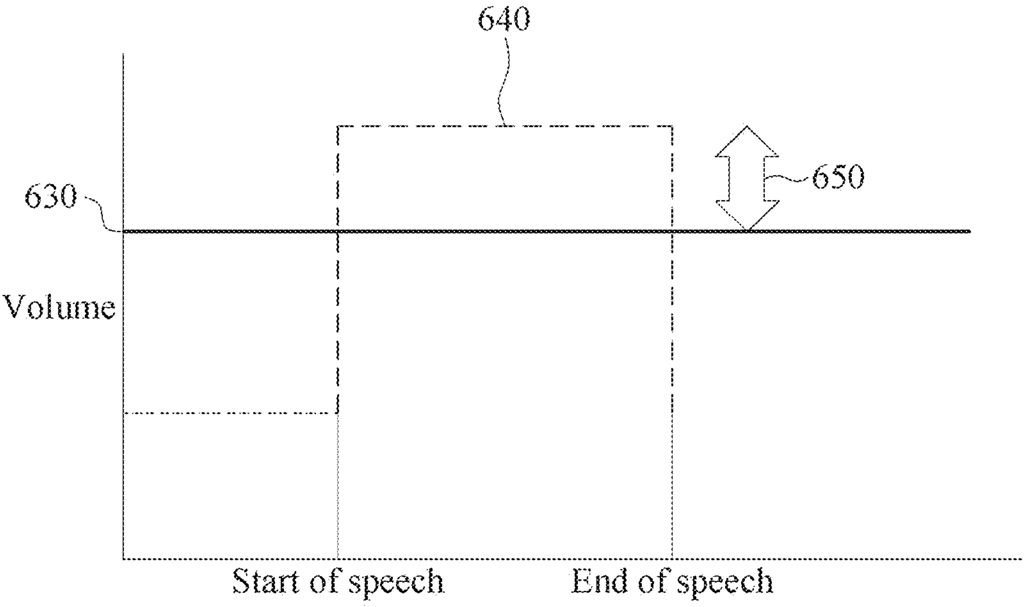
Figure 6C:
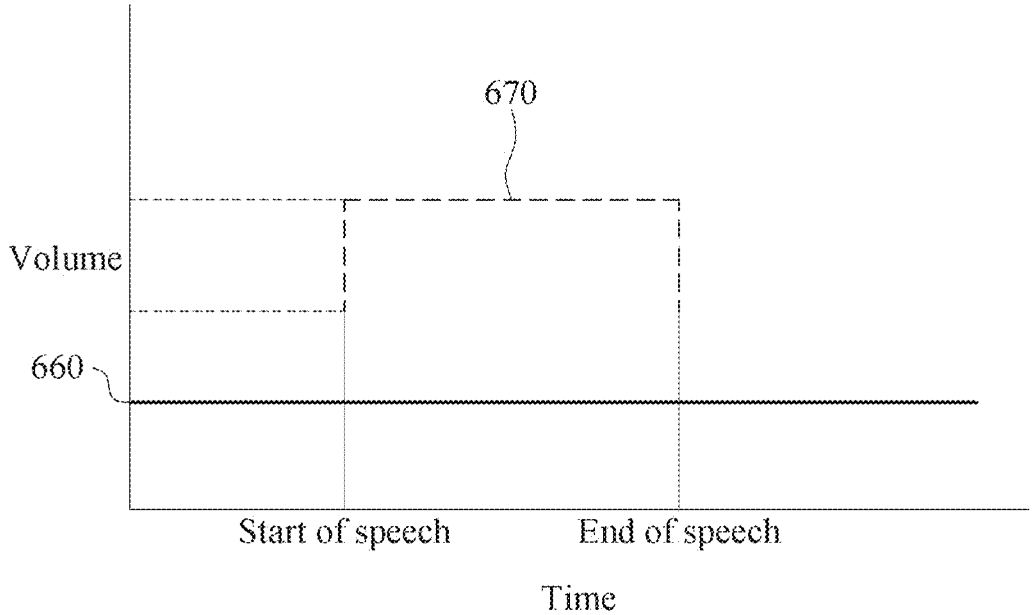

FIGS. 6A, 6B and 6C are diagrams including graphs illustrating an example method of adjusting an output volume of a first electronic device based on the volume of the second electronic device that is measured in a first electronic device when a conversation partner speaks, according to various embodiments.

According to an embodiment, the first electronic device 110 and/or the server 130 may adjust an output volume of the first electronic device 110 while maintaining an output volume of the second electronic device 150 such that the output volume of the first electronic device 110 does not disturb a user's content watching. According to an embodiment, the first electronic device 110 may adjust the output volume by receiving a command signal from the server 130. According to an embodiment, the first electronic device 110 may adjust the output volume by receiving a command signal from the second electronic device 150. According to an embodiment, the first electronic device 110 may determine a first volume adjustment amount based on the volume of the second electronic device 150 measured in the first electronic device 110.

FIG. 6A is a diagram illustrating the method of adjusting the output volume of the first electronic device 110 when the volume of the second electronic device 150 measured in the first electronic device 110 exceeds a first reference volume. FIG. 6A illustrates a volume 610 of the second electronic device 150 measured in the first electronic device 110, which is greater than or equal to the first reference volume, and a volume 620 of the conversation partner's voice.

According to an embodiment, the server 130 may adjust the output volume of the first electronic device 110 to be the same as the volume of the second electronic device 150 measured in the first electronic device 110. According to an embodiment, the first reference volume may include a volume determined based on whether sounds, excluding conversation sounds, are loud. For example, the first reference volume may be 70 dB. Accordingly, when a volume of sound exceeds the first reference volume, the sound may be very loud. For example, the server 130 may adjust the output volume of the first electronic device 110 to 75 dB when the volume of the second electronic device 150 measured in the first electronic device 110 is 75 dB. This may be because the output volume of the first electronic device 110, the size of which is the same as the volume of the second electronic device 150 measured in the first electronic device 110, when both are greater than or equal to the first reference volume, is determined such that the user may recognize the conversation partner's voice without the conversation partner's voice aggravating noise. If surrounding sounds are noisy, the conversation partner's voice may not be accurately transmitted to the user. Accordingly, the first electronic device 110 may transmit the conversation partner's voice by displaying the conversation partner's voice in a text form through the third call object 530.

FIG. 6B is a diagram illustrating the method of adjusting the output volume of the first electronic device 110 when the volume of the second electronic device 150 measured in the first electronic device 110 is less than or equal to the first reference volume and greater than or equal to a second reference volume. FIG. 6B illustrates a volume 630 of the second electronic device 150 measured in the first electronic device 110, which is greater than or equal to the second reference volume (e.g., 53 dB) and less than or equal to the first reference volume (e.g., 70 dB), and a volume 640 of the conversation partner's voice.

According to an embodiment, the second reference volume may include a volume determined based on information on conversation volumes of general people. For example, the second reference volume may be 53 dB. According to an embodiment, the server 130 may adjust the output volume of the first electronic device based on a value obtained by adding a second predetermined volume 650 to the volume of the second electronic device measured in the first electronic device. According to an embodiment, a second predetermined volume may be determined based on a difference between a target sound and a background sound to the extent that the target sound does not stand out compared to the background sound, but the content of voice may be recognized. For example, the second predetermined volume may be 3 dB. For example, when the volume of the second electronic device measured in the first electronic device is 57 dB, the volume 640 of the conversation partner's voice may be 60 dB, which is obtained by adding the second predetermined volume 650 to 57 dB.

FIG. 6C is a diagram illustrating the method of adjusting the output volume of the first electronic device 110 when the volume of the second electronic device 150 measured in the first electronic device 110 less than the second reference volume. FIG. 6C illustrates a volume 660 of the second electronic device 150 measured in the first electronic device 110, which is less than or equal to the second reference volume (e.g., 53 dB), and a volume 670 of the conversation partner's voice.

According to an embodiment, the server 130 may adjust the output volume of the second electronic device based on the second reference volume and the second predetermined volume. For example, when the second reference volume is 53 dB, and the second predetermined volume is 3 dB, the volume 670 of the conversation partner's voice may be output at 56 dB. 56 dB may be a minimum volume at which the user may comfortably recognize the conversation partner's voice.

Figure 7:
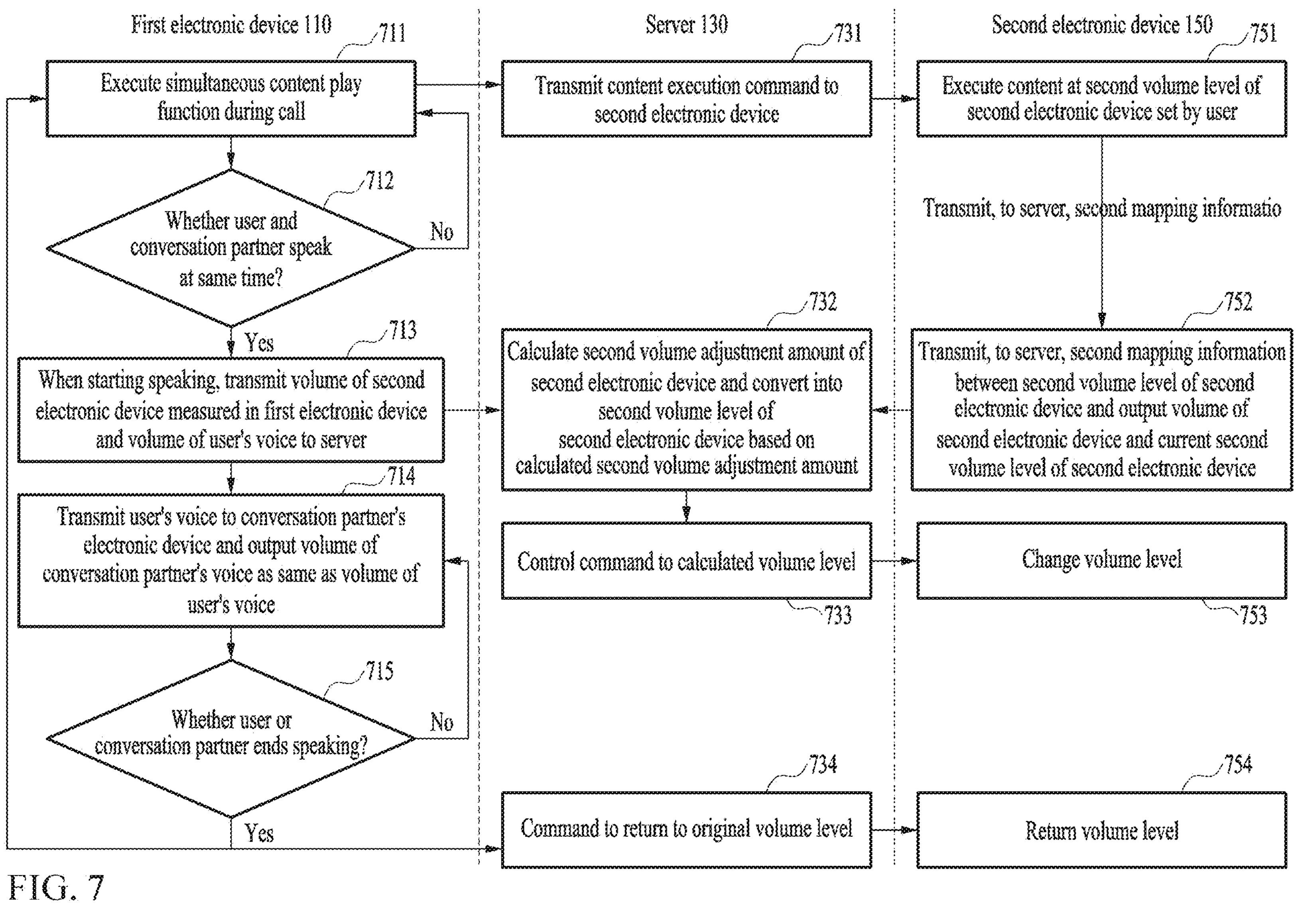
FIG. 7 is a flowchart illustrating an example method of adjusting an output volume of a first electronic device and an output volume of a second electronic device when a user and a conversation partner speak at the same time, according to various embodiments.

FIG. 7 is a flowchart illustrating an example method of adjusting an output volume of a first electronic device and an output volume of a second electronic device when a user and a conversation partner speak at the same time, according to various embodiments.

According to an embodiment, when the user and the conversation partner speak at the same time, the method of adjusting an output volume of the first electronic device 110 may be the same as the method (the method described above with reference to FIGS. 4, 5, 6A, 6B, and 6C) of adjusting the output volume when the conversation partner speaks. In addition, the method of adjusting an output volume of the second electronic device 150 may be the same as the method (the method described above with reference to FIGS. 1, 2, 3A, and 3B) of adjusting the output volume when the user speaks.

According to an embodiment, the first electronic device 110 may execute, in operation 711, a simultaneous content play function during a call. According to an embodiment, the server 130 may receive a signal related to the execution of the simultaneous content play function from the first electronic device 110. In this case, the server may transmit, in operation 731, a content execution command to the second electronic device 150. According to an embodiment, the second electronic device 150 may execute, in operation 751, content at a second volume level of the second electronic device set by the user.

According to an embodiment, the first electronic device 110 may determine whether the user and the conversation partner start speaking at the same time in operation 712. For example, when receiving a voice input from the user while receiving a voice signal from the conversation partner's electronic device, the first electronic device 110 may recognize that the user and the conversation partner start speaking at the same time.

According to an embodiment, at the time when the user and the conversation partner start speaking, the volume of the second electronic device 150 measured in the first electronic device 110 and the volume of the user's voice may be transmitted, in operation 713, to the server 130.

According to an embodiment, the second electronic device 150 may transmit, in operation 752, to the server 130, second mapping information between the second volume level of the second electronic device 150 and an output volume of the second electronic device 150 and the current second volume level of a second electronic device.

According to an embodiment, the server 130 may calculate a second volume adjustment amount of the second electronic device and may convert, in operation 732, the output volume of the second electronic device 150 determined based on the calculated second volume adjustment amount into the second volume level of the second electronic device. Since the method of adjusting the output volume of the second electronic device is described in greater detail above with reference to FIG. 1, the repeated description thereof is omitted with reference to the present drawing.

According to an embodiment, the server 130 may transmit, in operation 733, a control command to a calculated volume level to the second electronic device 150. According to an embodiment, the server 130 may transmit a control command based on the calculated second volume adjustment amount to the second electronic device 150. In this case, the second electronic device 150 may adjust the output volume of the second electronic device 150 after converting based on the calculated second volume adjustment amount into the second volume level of the second electronic device 150.

According to an embodiment, the second electronic device 150 may change, in operation 753, a volume level by receiving a control command from the server 130.

According to an embodiment, the first electronic device 110 may transmit the user's voice to the conversation partner's electronic device and may output, in operation 714, the volume of the conversation partner's voice as same as the volume of the user's voice. Since the method of adjusting the output volume of the first electronic device 110 is described in greater detail above with reference to FIG. 4, a description thereof may not be repeated here.

According to an embodiment, the first electronic device 110 may determine whether the user or the conversation partner stops speaking in operation 715. According to an embodiment, when the user or the conversation partner stops speaking, the first electronic device 110 may transmit a signal that notifies the end of speech to the server 130. In this case, the server 130 may transmit a command 734 to return to an original volume level to the second electronic device 150. The second electronic device 150 that receives such a command may adjust the output volume by returning, in operation 754, the volume level.

Figure 8:
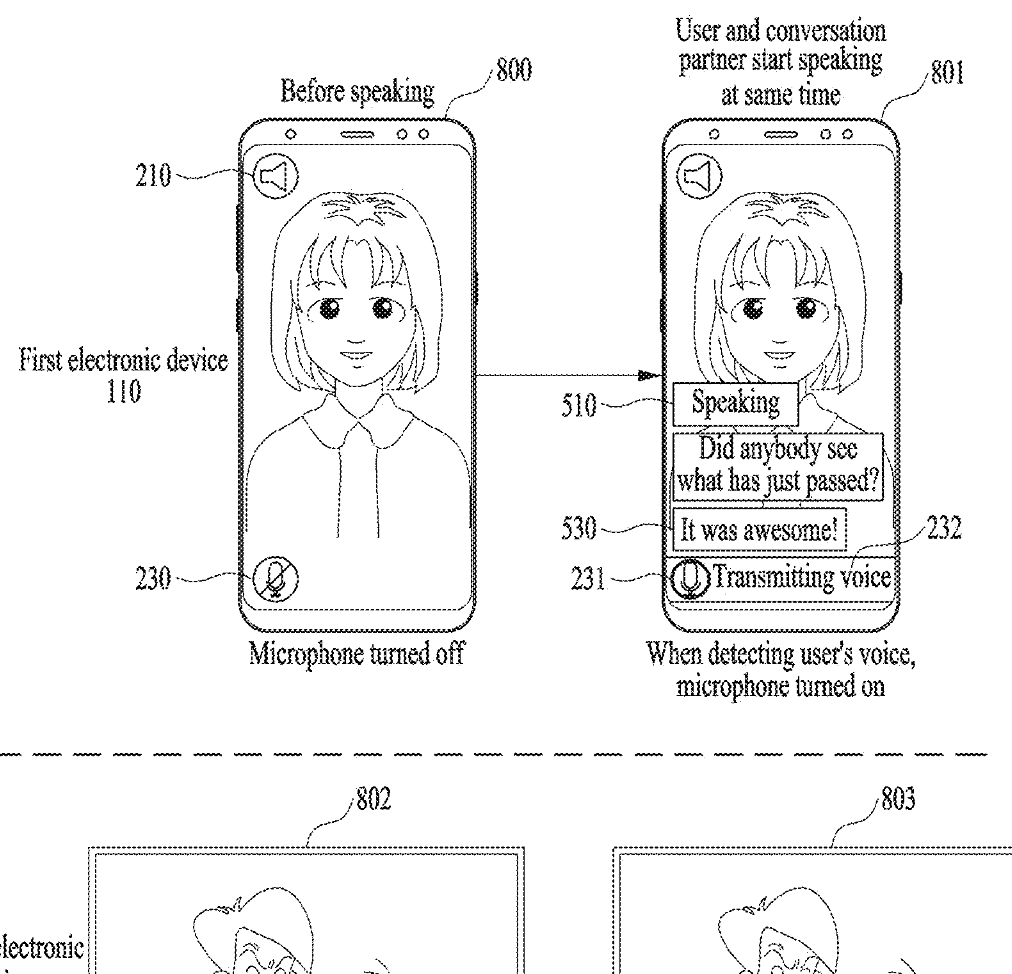
FIG. 8 is a diagram illustrating a screen of a first electronic device and a screen of a second electronic device when a user and a conversation partner speak at the same time, according to various embodiments.

FIG. 8 is a diagram illustrating an example screen of a first electronic device and a screen of a second electronic device when a user and a conversation partner speak at the same time, according to various embodiments.

FIG. 8 illustrates a screen 800 of the first electronic device before the user and the conversation partner speak, a screen 801 of the first electronic device when the user and the conversation partner start speaking at the same time, a screen 802 of the second electronic device before the user and the conversation partner speak, a screen 803 of the second electronic device 150 when the user and the conversation partner start speaking at the same time, the volume object 210, the voice transmission off object 230, the voice transmission on object 231, the second call object 510, the third call object 530, the output volume display object 250, and the volume adjustment display object 270.

According to an embodiment, the volume object 210, the voice transmission on object 231, the second call object 510, and/or the third call object 530 may be displayed on the screen 801 of the first electronic device when the user and the conversation partner start speaking.

According to an embodiment, the output volume display object 250 and/or the volume adjustment display object 270 may be displayed on the screen 803 of the second electronic device 150 when the user and the conversation partner start speaking at the same time.

Figure 9:
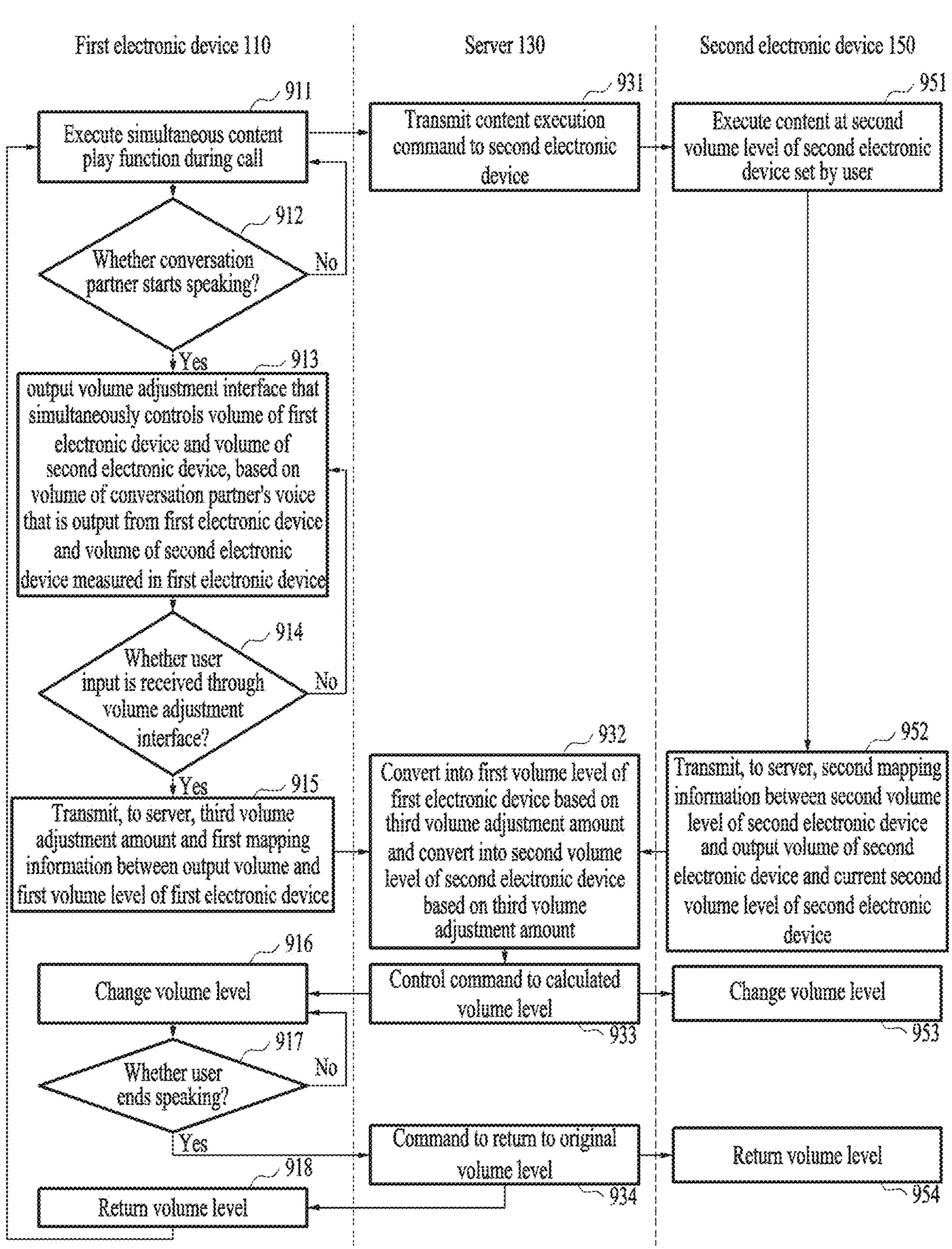
FIG. 9 is a flowchart illustrating an example method of adjusting an output volume of a first electronic device and an output volume of a second electronic device through a volume adjustment interface, according to various embodiments.

FIG. 9 is a flowchart illustrating an example method of adjusting an output volume of a first electronic device and an output volume of a second electronic device through a volume adjustment interface, according to various embodiments.

According to an embodiment, the first electronic device 110 may execute, in operation 911, a simultaneous content play function during a call. According to an embodiment, the server 130 may receive a signal related to the execution of the simultaneous content play function from the first electronic device 110. In this case, the server may transmit, in operation 931, a content execution command to the second electronic device 150. According to an embodiment, the second electronic device 150 may execute, in operation 951, content at a second volume level of the second electronic device set by the user.

According to an embodiment, the first electronic device 110 may determine whether the conversation partner starts speaking in operation 912.

According to an embodiment, when the conversation partner starts speaking, the first electronic device 110 may output, in operation 913, the volume adjustment interface that simultaneously controls the volume of the first electronic device 110 and the volume of the second electronic device 150, based on the volume of the conversation partner's voice that is output from the first electronic device 110 and the volume of the second electronic device 150 measured in the first electronic device 110.

According to an embodiment, the voice adjustment interface may include at least one of an output volume adjustment object of the first electronic device and an output volume adjustment object of the second electronic device. The volume adjustment interface is described in greater detail below with reference to FIG. 10.

According to an embodiment, the first electronic device 110 may determine whether a user input is received through the volume adjustment interface in operation 914. According to an embodiment, when the user input is received, the first electronic device 110 may transmit, in operation 915, to a server, a third volume adjustment amount and first mapping information between an output volume and a first volume level of the first electronic device. According to an embodiment, the third volume adjustment amount may include a volume adjustment amount input through the volume adjustment interface.

According to an embodiment, the second electronic device 150 may transmit, in operation 952, to a server, second mapping information between the second volume level of the second electronic device 150 and an output volume of the second electronic device 150 and the current second volume level of the second electronic device.

According to an embodiment, the server 130 may convert, in operation 932, the output volume of the first electronic device 110 determined based on the third volume adjustment amount into the first volume level of the first electronic device 110 and may convert the output volume of the second device 150 determined based on the third volume adjustment amount into the second volume level of the second electronic device. According to an embodiment, both the output volume of the first electronic device 110 and the output volume of the second electronic device 150 may be adjusted through the volume adjustment interface.

According to an embodiment, the server 130 may transmit, in operation 933, a control command about the calculated volume level to the first electronic device 110 and the second electronic device 150. According to an embodiment, the command to convert the output volume of the first electronic device 110 into the calculated first volume level may be transmitted to the first electronic device 110 and the command to convert the output volume of the second electronic device 150 into the calculated second volume level may be transmitted to the second electronic device 150.

According to an embodiment, the first electronic device 110 may change, in operation 916, a volume level by receiving the command. According to an embodiment, the second electronic device 150 may change, in operation 953, a volume level by receiving a control command from the server 130.

According to an embodiment, the first electronic device 110 may determine whether the user's speech ends in operation 917. When the user's speech ends, the first electronic device 110 may transmit a signal that notifies the end of the user's speech to the server 130. In this case, the server 130 may transmit a command 934 to return to an original volume level to the first electronic device 110 and the second electronic device 150. The first electronic device 110 that receives such a command may return, in operation 918, to an original volume level. In addition, the second electronic device 150 that receives such a command may also return, in operation 954, to the original volume level.

Figure 10:
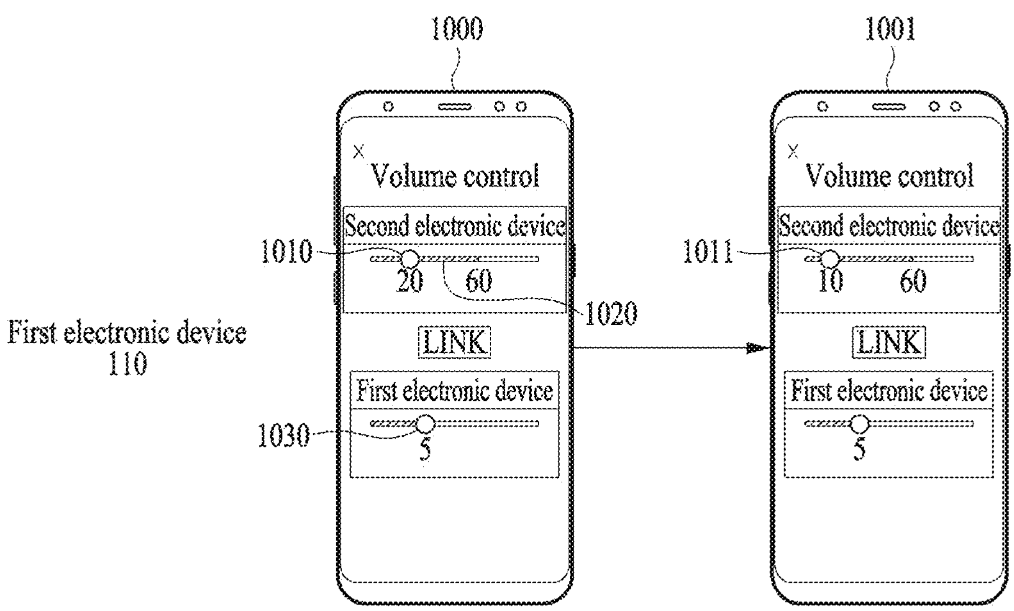
FIG. 10 is a diagram illustrating a volume adjustment interface according to various embodiments.
Figure 10:
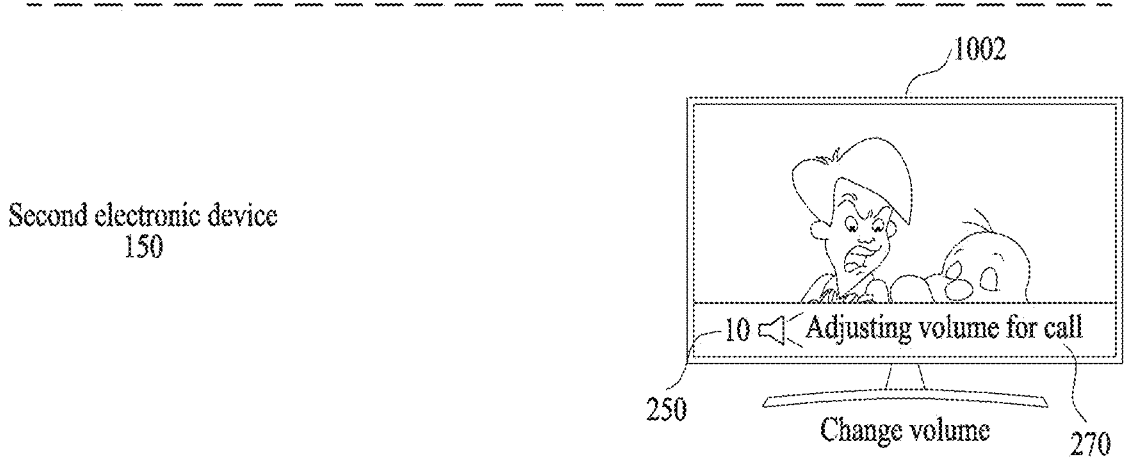

FIG. 10 is a diagram illustrating an example volume adjustment interface according to various embodiments.

FIG. 10 illustrates a volume adjustment interface 1000 before adjusting a volume, a volume adjustment interface 1001 after adjusting a volume, a screen 1002 of a second electronic device after adjusting a volume, an output volume adjustment object 1030 of a first electronic device, an output volume adjustment object 1010 of the second electronic device, and a volume display object 1020 before adjusting an output volume of the second electronic device.

According to an embodiment, the volume adjustment interface 1000 before adjusting a volume may include at least one of the output volume adjustment object 1030 of the first electronic device, the volume display object 1020 before adjusting the output volume of the second electronic device, and the output volume adjustment object 1010 of the second electronic device. For example, the output volume of the second electronic device 150 may be adjusted when the user starts speaking. In this case, the output volume of the second electronic device 150 before the user starts speaking may be displayed through the volume display object 1020 before adjusting the output volume of the second electronic device. For example, when the output volume of the second electronic device 150 before the user starts speaking is 60 dB, the volume display object 1020 before adjusting the output volume of the second electronic device may display 60. When the output volume of the second electronic device 150 is adjusted to 20 dB, the output volume adjustment object 1010 of the second electronic device may display 20. The output volume of the first electronic device before and after being adjusted may also be displayed like the second electronic device. Referring to FIG. 10, the output volume adjustment object 1030 of the first electronic device may display the current output volume of the first electronic device. The user may adjust the output volume of the first electronic device 110 through the output volume adjustment object 1030 of the first electronic device.

According to an embodiment, the volume adjustment interface 1001 after adjusting a volume may include an interface that displays the changing of the output volume of the second electronic device from 20 to 10. In this case, the output volume adjustment object 1011 of the second electronic device 150 may display 10. Accordingly, the changing of the output volume to 10 may be displayed through the output volume display object 250 and the volume adjustment display object 270 on the screen 1002 of the second electronic device after adjusting a volume.

Figure 11:
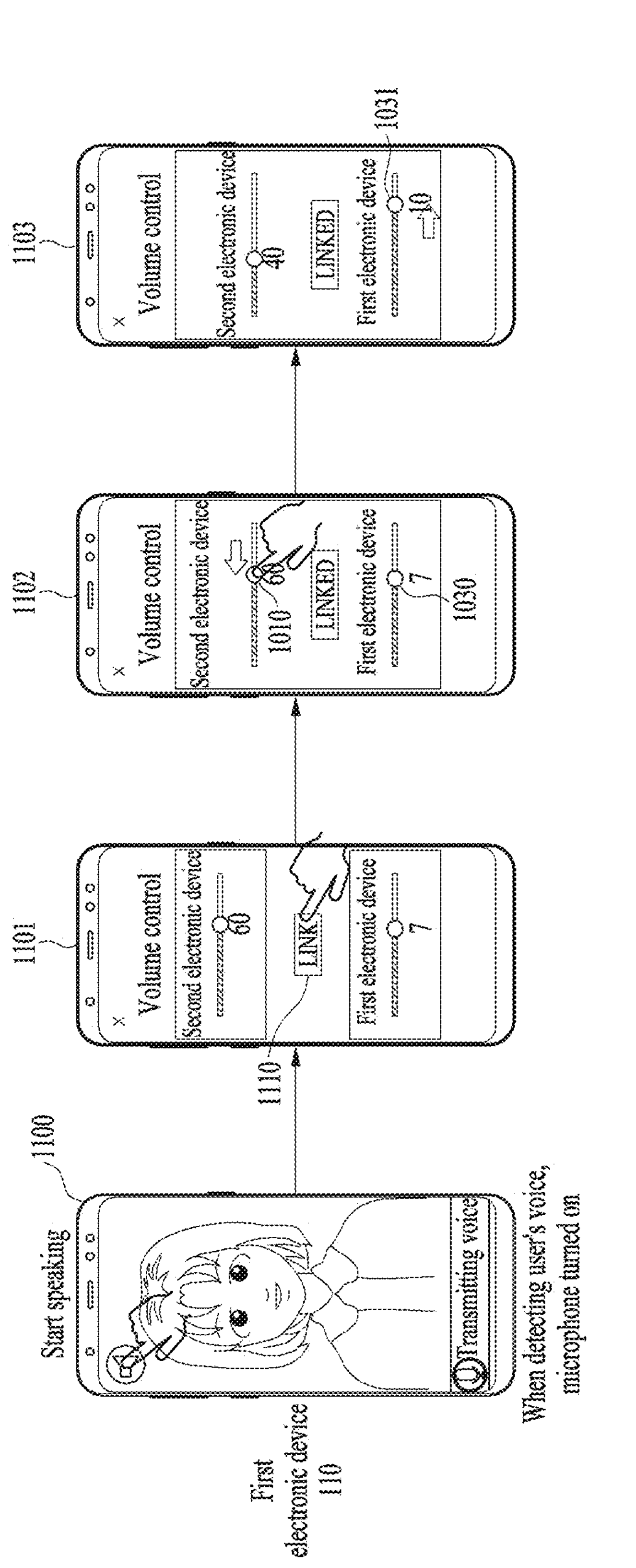
FIG. 11 is a diagram illustrating an example operation of adjusting an output volume of a first electronic device and an output volume of a second electronic device in an inverse proportion to each other through a volume adjustment interface, according to various embodiments.
Figure 11:
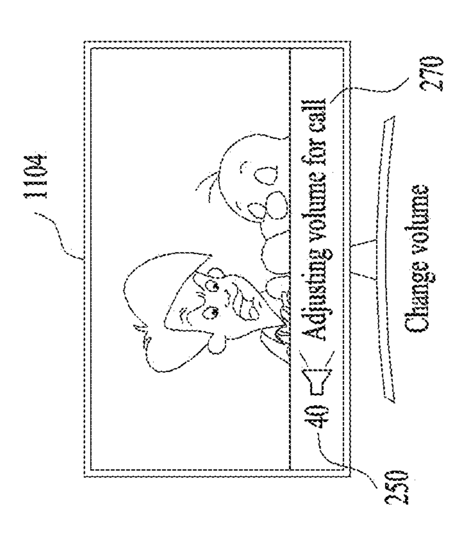

FIG. 11 is a diagram illustrating an example operation of adjusting an output volume of a first electronic device and an output volume of a second electronic device in an inverse proportion to each other through a volume adjustment interface, according to various embodiments.

FIG. 11 illustrates a screen 1100 of the first electronic device when speech is started, a screen 1101 for inputting a link object, a screen 1102 for adjusting the output volume of the second electronic device after inputting the link object, an automatic output volume adjustment screen 1103 of the first electronic device, a screen 1104 of the second electronic device after adjusting a volume, a link object 1110, the output volume adjustment object 1030 of the first electronic device, the output volume adjustment object 1010 of the second electronic device, the output volume adjustment object 1031 of the first electronic device after adjusting a volume, the output volume display object 250, and the volume adjustment display object 270.

According to an embodiment, the volume adjustment interface may be displayed on the screen of the first electronic device 110 when an input of selecting the volume object 210 is received.

According to an embodiment, on the screen 1100 of the first electronic device when speech is started, the first electronic device 110 may receive the input of selecting the volume object 210 from a user. In this case, the first electronic device 110 may output the volume adjustment interface on the screen.

According to an embodiment, the volume adjustment interface may include the link object 1110. According to an embodiment, the link object 1110 may include an object for linking the adjustment of the output volume of the first electronic device to the adjustment of the output volume of the second electronic device. According to an embodiment, when the input of the link object 1110 is received, the output volume of the second electronic device may be adjusted in inverse proportion to the output volume of the first electronic device, or the output volume of the first electronic device may be adjusted in inverse proportion to the output volume of the second electronic device.

According to an embodiment, the screen 1101 for inputting a link object may display a screen where the user selects the link object.

According to an embodiment, after inputting the link object, on the screen 1102 for adjusting the output volume of the second electronic device may include a screen where the user changes the output volume of the second electronic device 150 from 60 to 40. On the screen, the output volume of the first electronic device 110 may be 7.

According to an embodiment, on the automatic output volume adjustment screen 1103 of the first electronic device, an inverse proportional increase of the output volume of the first electronic device 1100 from 7 to 10 is displayed as the output volume of the second electronic device 150 decreases from 60 to 40. In this case, the output volume adjustment object 1030 of the first electronic device after adjusting a volume may display 10. Accordingly, the changing of the output volume of the second electronic device to 40 may be displayed through the output volume display object 250 and the volume adjustment display object 270 on the screen 1104 of the second electronic device after adjusting a volume.

Figure 12:
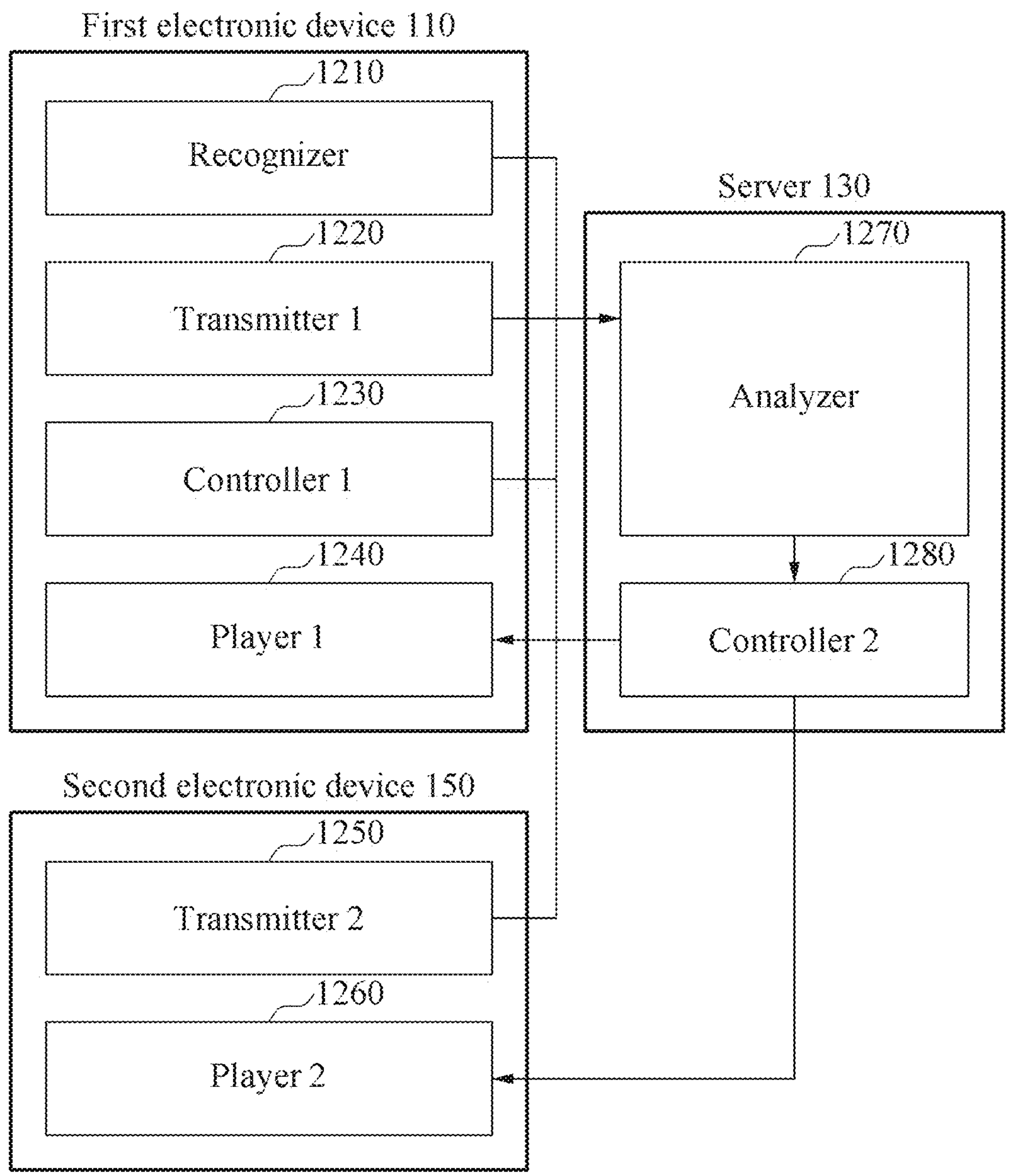
FIG. 12 is a block diagram illustrating an example configuration of a system for adjusting the volume of an electronic device, according to various embodiments.

FIG. 12 is a block diagram illustrating an example configuration of a system for adjusting the volume of an electronic device, according to various embodiments.

FIG. 12 illustrates the first electronic device 110, the server 130, the second electronic device 150, a recognizer (e.g., including various circuitry and/or executable program instructions) 1210, a transmitter (e.g., including communication circuitry) 1 1220, a controller 1 (e.g., including at least one processor including processing circuitry) 1230, a player 1 (e.g., including various circuitry and/or executable program instructions) 1240, a transmitter 2 (e.g., including communication circuitry) 1250, a player 2 (e.g., including various circuitry and/or executable program instructions) 1260, an analyzer (e.g., including various circuitry and/or executable program instructions) 1270, and a controller 2 (e.g., including at least one processor including processing circuitry) 1280. The first electronic device 110, the server 130, and the second electronic device 150 illustrated in FIG. 12 may further include additional components, or some components may be omitted. The present disclosure is just an example, and examples are not limited thereto.

According to an embodiment, the first electronic device 110 may include the recognizer 1210, the transmitter 1 1220, the controller 1 1230, and/or the player 1 1240. According to an embodiment, the recognizer 1210 may detect the start and/or the end of a user's speech. According to an embodiment, the recognizer 1210 may measure a volume by distinguishing the output volume of the second electronic device from the volume of the user's voice. According to an embodiment, the transmitter 1 1220 may transmit first mapping information to the server 130. According to an embodiment, the transmitter 1 1220 may transmit information (e.g., a first volume level) related to the output volume of the first electronic device 110 to the server 130. According to an embodiment, the controller 1 1230 may output a volume adjustment interface on the screen of the first electronic device 110. According to an embodiment, the player 1 1240 may output a conversation partner's voice based on the first volume level received from the server 130. For example, when the first volume level=10, the conversation partner's voice may be output at the first volume level=10. When an output volume corresponding to the first volume level=10 is 40 dB, the output volume of the first electronic device may be 40 dB.

According to an embodiment, the server 130 may include the analyzer 1270 and/or the controller 2 1280.

According to an embodiment, the analyzer 1270 may calculate a second volume adjustment amount which does not disturb the input of the user's voice to the first electronic device 110. According to an embodiment, the analyzer 1270 may convert the output volume of the second electronic device 150 into a second volume level based on a second volume adjustment level. According to an embodiment, the analyzer 1270 may analyze a degree that feels noisy to the user based on the volume of the second electronic device 150 measured in the first electronic device 110. Based on this, the server 130 may adjust the volume of the second electronic device. Since the second volume adjustment amount, the method of adjusting the volume of the second electronic device based on the second volume adjustment amount, and the method of converting the output volume of the second electronic device 150 into the second volume level are described above with reference to FIGS. 1, 2, 3A, and 3B, a description thereof may not be repeated here.

According to an embodiment, the analyzer 1270 may calculate a first volume adjustment amount to adjust a suitable output volume of the first electronic device such that the conversation partner's voice is heard by the user through the first electronic device. In addition, the analyzer 1270 may convert the first volume of the first electronic device 110 into the first volume level based on the first volume adjustment amount. Since the first volume adjustment amount, the method of adjusting the volume of the first electronic device based on the first volume adjustment amount, and the method of converting the output volume of the first electronic device 110 into the first volume level are described above with reference to FIGS. 4, 5, 6A, 6B, and 6C, a description thereof may not be repeated here.

According to an embodiment, the analyzer 1270 may convert the output volume into volume levels of each of the first and second electronic devices based on a third volume adjustment amount input through the volume adjustment interface. For example, when the third volume adjustment amount is an adjustment amount for adjusting the output volume of the first electronic device, the analyzer 1270 may convert the output volume of the first electronic device 110 into the first volume level based on the third volume adjustment amount. For another example, when the third volume adjustment amount is an adjustment amount for adjusting the output volume of the second electronic device, the analyzer 1270 may convert the output volume of the second electronic device 150 into the second volume level based on the third volume adjustment amount. Since the volume adjustment interface is described above with reference to FIGS. 9 to 11, the description may not be repeated here.

According to an embodiment, the first electronic device 110 may include the analyzer 1270. Accordingly, the first electronic device 110 may adjust the output volume by itself without transmitting information related to the output volume of the first electronic device 110 and the first mapping information to the server 130.

According to an embodiment, the second electronic device 150 may include the analyzer 1270.

According to an embodiment, the controller 2 1280 may transmit the calculated first volume level to the first electronic device 110. According to an embodiment, the controller 2 1280 may transmit the calculated second volume level to the second electronic device 150.

According to an embodiment, the second electronic device 150 may include the transmitter 2 1250 and/or the player 2 1260. According to an embodiment, the transmitter 2 1250 may transmit second mapping information to the server 130. According to an embodiment, the transmitter 2 1250 may transmit the output volume of the second electronic device 150 to the server 130. According to an embodiment, the player 1 1260 may output content's sound based on the second volume level received from the server 130. For example, when the second volume level=10, the content's sound may be output at the second volume level=10. When an output volume corresponding to the second volume level=10 is 40 dB, the output volume of the second electronic device may be 40 dB.

Figure 13:
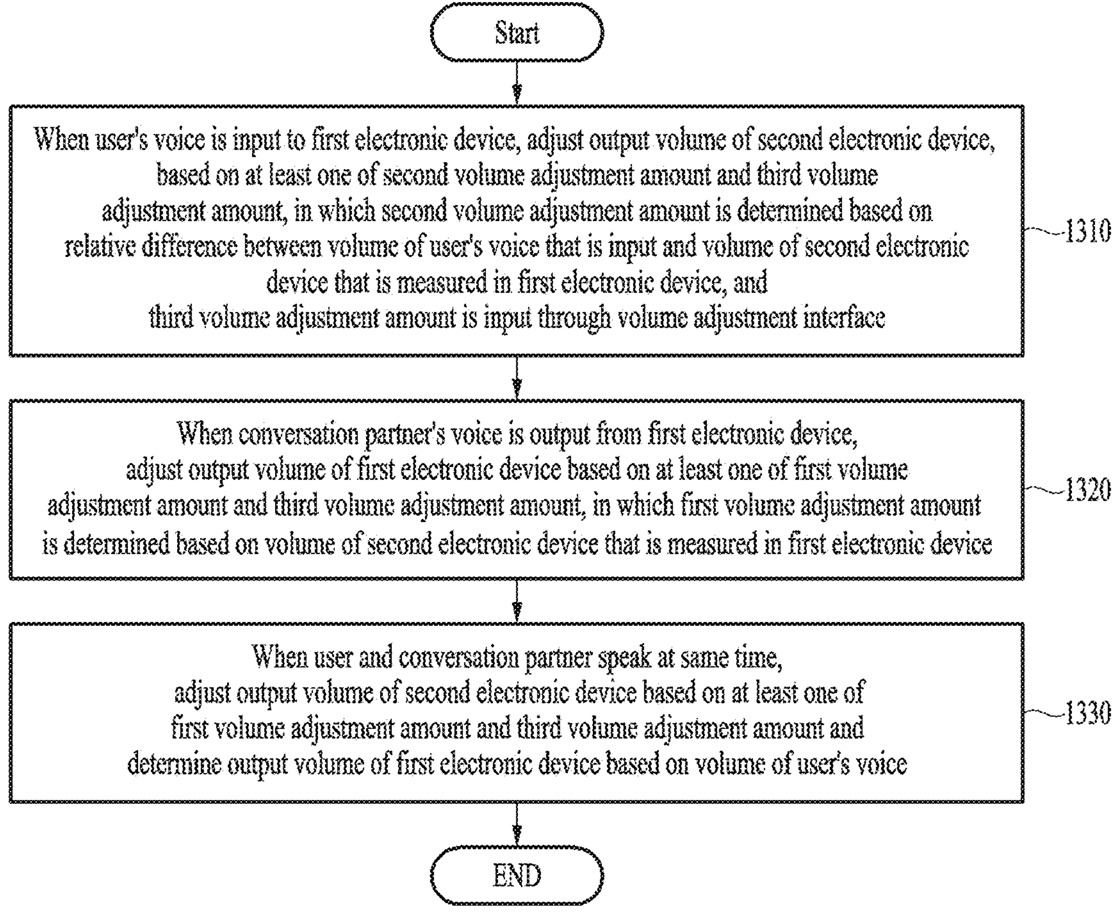
FIG. 13 is a flowchart illustrating an example method of adjusting the volume of an electronic device, according to various embodiments.

FIG. 13 is a flowchart illustrating an example method of adjusting the volume of an electronic device, according to various embodiments.

Referring to FIG. 13, the electronic device may be the first electronic device 110, the second electronic device 150, or the server 130.

According to an embodiment, an electronic device 1401 (e.g., the electronic device 1401 of FIG. 14), when a user's voice is input to a first electronic device, may adjust, in operation 1310, an output volume of a second electronic device, based on at least one of a second volume adjustment amount and a third volume adjustment amount, in which the second volume adjustment amount is determined based on a relative difference between a volume of the user's voice that is input and a volume of the second electronic device that is measured in the first electronic device, and the third volume adjustment amount is input through a volume adjustment interface.

According to an embodiment, the electronic device 1401, when a conversation partner's voice is output from the first electronic device, may adjust, in operation 1320, an output volume of the first electronic device based on at least one of a first volume adjustment amount and the third volume adjustment amount, in which the first volume adjustment amount is determined based on the volume of the second electronic device that is measured in the first electronic device.

According to an embodiment, the electronic device 1401, when the user and the conversation partner speak at the same time, may adjust the output volume of the second electronic device based on at least one of the first volume adjustment amount and the third volume adjustment amount and may determine, in operation 1330, the output volume of the first electronic device based on the volume of the user's voice.

According to an embodiment, the electronic device 1401, when at least one of the user's speech and the conversation partner's speech ends, may adjust the output volume of the first electronic device or the output volume of the second electronic device to a volume before the output volume is adjusted.

According to an embodiment, the volume adjustment interface may include at least one of an output volume adjustment object of the first electronic device and an output volume adjustment object of the second electronic device.

According to an embodiment, the volume adjustment interface may include an object that displays a volume before the output volume of the second electronic device is adjusted.

According to an embodiment, the output volume of the second electronic device may be adjusted in inverse proportion to the output volume of the first electronic device, or the output volume of the first electronic device may be adjusted in inverse proportion to the output volume of the second electronic device.

According to an embodiment, the electronic device 1401 may display at least one of a volume object and a first call object through a display of the first electronic device, in which the volume object is configured to output the volume adjustment interface and the first call object is configured to display that the user's voice is normally transmitted to the conversation partner.

According to an embodiment, when the conversation partner's voice is output from the first electronic device, the electronic device 1401 may display at least one of a volume object, a second call object, and a third call object through a display of the first electronic device, in which the volume object is configured to output the volume adjustment interface, the second call object is configured to display that the conversation partner is speaking and the third call object is configured to display the conversation partner's voice in a text form.

According to an embodiment, the electronic device 1401, when the output volume of the second electronic device is adjusted, may display an object displaying that the output volume of the second electronic device is adjusted through a display of the second electronic device.

According to an embodiment, the adjusting of the output volume of the second electronic device may include an operation of adjusting the output volume of the second electronic device based on a relative difference between the output volume of the second electronic device and the volume of the second electronic device that is measured in the first electronic device.

According to an embodiment, the adjusting of the output volume of the second electronic device based on the second volume adjustment amount may include, when the volume of the user's voice that is input is less than a value obtained by adding a first predetermined volume to the volume of the second electronic device that is measured in the first electronic device, an operation of adjusting the output volume of the second electronic device such that the volume of the second electronic device that is measured in the first electronic device is less than a value obtained by subtracting the first predetermined volume from the volume of the user's voice that is input; and, when the volume of the user's voice that is input is greater than the value obtained by adding the first predetermined volume to the volume of the second electronic device that is measured in the first electronic device, an operation of maintaining the output volume of the second electronic device.

According to an embodiment, the adjusting of the output volume of the second electronic device based on the second volume adjustment amount may include, when the volume of the user's voice that is input is less than the volume of the second electronic device that is measured in the first electronic device, an operation of adjusting the output volume of the second electronic device such that the volume of the second electronic device that is measured in the first electronic device is less than a value obtained by subtracting a first predetermined volume from the volume of the user's voice that is input.

According to an embodiment, the adjusting of the output volume of the first electronic device based on the first volume adjustment amount may include, when the volume of the second electronic device that is measured in the first electronic device exceeds a first reference volume, an operation of adjusting the output volume of the first electronic device to be the same as the volume of the second electronic device that is measured in the first electronic device; when the volume of the second electronic device that is measured in the first electronic device is less than or equal to the first reference volume and is greater than or equal to a second reference volume, an operation of adjusting the output volume of the first electronic device based on a value obtained by adding a second predetermined volume to the volume of the second electronic device that is measured in the first electronic device; and, when the volume of the second electronic device that is measured in the first electronic device is less than the second reference volume, an operation of adjusting the output volume of the first electronic device based on the second reference volume and the second predetermined volume.

According to an embodiment, the determining of the output volume of the first electronic device based on the volume of the user's voice may include an operation of determining the output volume of the first electronic device corresponding to the volume of the conversation partner's voice to be the same as the volume of the user's voice.

According to an embodiment, the adjusting of the output volume of the first electronic device may include an operation of adjusting an output volume level of the first electronic device, based on the first volume adjustment amount and first mapping information between the output volume of the first electronic device and a first volume level, and the adjusting of the output volume of the second electronic device may include an operation of adjusting an output volume level of the second electronic device, based on the second volume adjustment amount and second mapping information between the output volume of the second electronic device and a second volume level.

Figure 14:
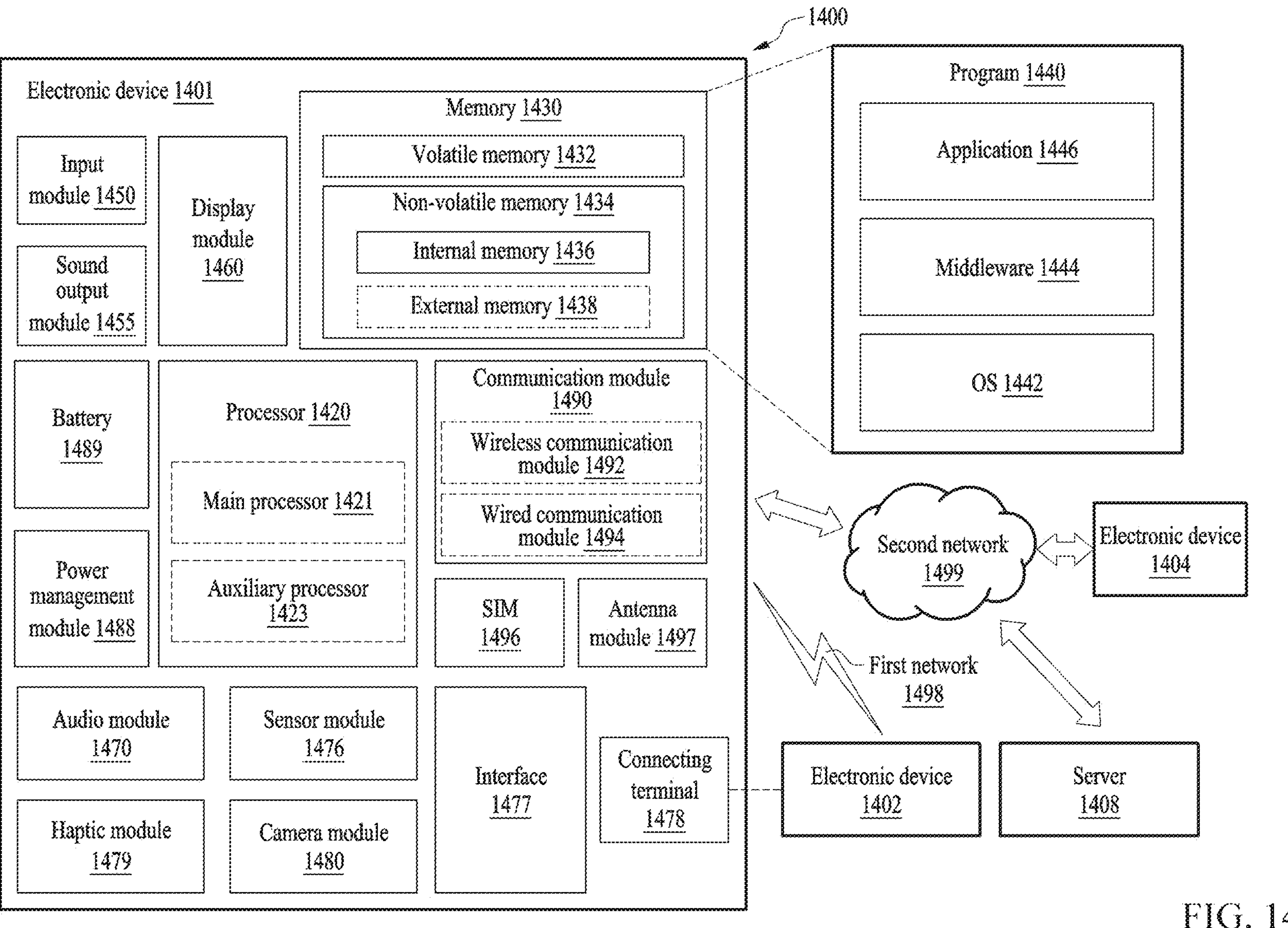
FIG. 14 is a block diagram illustrating an example electronic device in a network environment, according to various embodiments.

FIG. 14 is a block diagram illustrating an example electronic device in a network environment, according to various embodiments.

FIG. 14 is a block diagram illustrating an electronic device 1401 in a network environment 1400 according to various embodiments. Referring to FIG. 14, an electronic device 1401 in a network environment 1400 may communicate with an electronic device 1402 via a first network 1498 (e.g., a short-range wireless communication network) or at least one of an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, a memory 1430, an input module 1450, a sound output module 1455, a display module 1460, an audio module 1470, a sensor module 1476, an interface 1477, a connecting terminal 1478, a haptic module 1479, a camera module 1480, a power management module 1488, a battery 1489, a communication module 1490, a subscriber identification module (SIM) 1496, or an antenna module 1497. In various embodiments, at least one (e.g., the connecting terminal 1478) of the above components may be omitted from the electronic device 1401, or one or more other components may be added in the electronic device 1401. In various embodiments, some (e.g., the sensor module 1476, the camera module 1480, or the antenna module 1497) of the components may be integrated as a single component (e.g., the display module 1460).

The processor 1420 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1420 may execute, for example, software (e.g., a program 1440) to control at least one other component (e.g., a hardware or software component) of the electronic device 1401 connected to the processor 1420 and may perform various data processing or computation. According to an embodiment, as at least part of data processing or computation, the processor 1420 may store a command or data received from another component (e.g., the sensor module 1476 or the communication module 1490) in a volatile memory 1432, process the command or the data stored in the volatile memory 1432, and store resulting data in a non-volatile memory 1434. According to an embodiment, the processor 1420 may include a main processor 1421 (e.g., a central processing unit (CPU) or an application processor (AP)) or an auxiliary processor 1423 (e.g., a graphics processing unit (GPU), a neural processing unit (NPU), an image signal processor (ISP), a sensor hub processor, or a communication processor (CP)) that is operable independently from, or in conjunction with the main processor 1421. For example, when the electronic device 1401 includes the main processor 1421 and the auxiliary processor 1423, the auxiliary processor 1423 may be adapted to consume less power than the main processor 1421 or to be specific to a specified function. The auxiliary processor 1423 may be implemented as separate from, or as part of the main processor 1421. This description of the processor may apply equally to the controllers described above with reference to FIG. 12.

The auxiliary processor 1423 may control at least some of functions or states related to at least one (e.g., the display module 1460, the sensor module 1476, or the communication module 1490) of the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an ISP or a CP) may be implemented as part of another component (e.g., the camera module 1480 or the communication module 1490) functionally related to the auxiliary processor 1423. According to an embodiment, the auxiliary processor 1423 (e.g., an NPU) may include a hardware structure specified for artificial intelligence model processing. An artificial intelligence model may be generated by machine learning. Such learning may be performed, for example, by the electronic device 1401 in which an artificial intelligence model is executed, or via a separate server (e.g., the server 1408). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-network or a combination of two or more thereof but is not limited thereto. The artificial intelligence model may additionally or alternatively include a software structure other than the hardware structure.

The memory 1430 may store various pieces of data used by at least one component (e.g., the processor 1420 or the sensor module 1476) of the electronic device 1401. The various pieces of data may include, for example, software (e.g., the program 1440) and input data or output data for a command related thereto. The memory 1430 may include the volatile memory 1432 or the non-volatile memory 1434.

The program 1440 may be stored as software in the memory 1430, and may include, for example, an operating system (OS) 1442, middleware 1444, or an application 1446.

The input module 1450 may receive a command or data to be used by another component (e.g., the processor 1420) of the electronic device 1401, from the outside (e.g., a user) of the electronic device 1401. The input module 1450 may include, for example, a microphone, a mouse, a keyboard, a key (e.g., a button), or a digital pen (e.g., a stylus pen).

The sound output module 1455 may output a sound signal to the outside of the electronic device 1401. The sound output module 1455 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 1460 may visually provide information to the outside (e.g., a user) of the electronic device 1401. The display module 1460 may include, for example, a display, a hologram device, or a projector and control circuitry to control a corresponding one of the display, hologram device, and projector. According to an embodiment, the display module 1460 may include a touch sensor adapted to sense a touch, or a pressure sensor adapted to measure the intensity of force incurred by the touch.

The audio module 1470 may convert a sound into an electrical signal and vice versa. According to an embodiment, the audio module 1470 may obtain the sound via the input module 1450 or output the sound via the sound output module 1455 or an external electronic device (e.g., the electronic device 1402 such as a speaker or headphones) directly or wirelessly connected to the electronic device 1401.

The sensor module 1476 may detect an operational state (e.g., power or temperature) of the electronic device 1401 or an environmental state (e.g., a state of a user) external to the electronic device 1401 and generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device (e.g., the electronic device 1402) directly (e.g., by wire) or wirelessly. According to an embodiment, the interface 1477 may include, for example, a high-definition multimedia interface (HDMI), a universal serial bus (USB) interface, a secure digital (SD) card interface, or an audio interface.

The connecting terminal 1478 may include a connector via which the electronic device 1401 may be physically connected to the external electronic device (e.g., the electronic device 1402). According to an embodiment, the connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via his or her tactile sensation or kinesthetic sensation. According to an embodiment, the haptic module 1479 may include, for example, a motor, a piezoelectric element, or an electric stimulator.

The camera module 1480 may capture a still image and moving images. According to an embodiment, the camera module 1480 may include one or more lenses, image sensors, ISPs, or flashes.

The power management module 1488 may manage power supplied to the electronic device 1401. According to an embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more CPs that are operable independently of the processor 1420 (e.g., an AP) and that support a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module, or a power line communication (PLC) module). A corresponding one of these communication modules may communicate with the external electronic device 1404 via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip) or may be implemented as multiple components (e.g., multiple chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the SIM 1496.

The wireless communication module 1492 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1492 may support a high-frequency band (e.g., a mmWave band) to achieve, e.g., a high data transmission rate. The wireless communication module 1492 may support various technologies for securing performance on a high-frequency band, such as, e.g., beamforming, massive multiple-input and multiple-output (massive MIMO), full dimensional MIMO (FD-MIMO), an array antenna, analog beamforming, or a large-scale antenna. The wireless communication module 1492 may support various requirements specified in the electronic device 1401, an external electronic device (e.g., the electronic device 1404), or a network system (e.g., the second network 1499). According to an embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., the external electronic device). According to an embodiment, the antenna module 1497 may include an antenna including a radiating element including a conductive material or a conductive pattern formed in or on a substrate (e.g., a printed circuit board (PCB)). According to an embodiment, the antenna module 1497 may include a plurality of antennas (e.g., array antennas). In such a case, at least one antenna appropriate for a communication scheme used in a communication network, such as the first network 1498 or the second network 1499, may be selected by, for example, the communication module 1490 from the plurality of antennas. The signal or power may be transmitted or received between the communication module 1490 and the external electronic device via the at least one selected antenna. According to an embodiment, another component (e.g., a radio frequency integrated circuit (RFIC)) other than the radiating element may be additionally formed as part of the antenna module 1497.

According to an embodiment, the antenna module 1497 may form a mmWave antenna module. According to an embodiment, the mmWave antenna module may include a PCB, an RFIC on a first surface (e.g., the bottom surface) of the PCB, or adjacent to the first surface of the PCB and capable of supporting a designated high-frequency band (e.g., a mm Wave band), and a plurality of antennas (e.g., array antennas) arranged on a second surface (e.g., the top or a side surface) of the PCB, or adjacent to the second surface of the PCB and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device (e.g., the electronic device 1404) via the server 1408 coupled with the second network 1499. Each of the external electronic devices 1402 and 1404 may be a device of the same type as or a different type from the electronic device 1401. According to an embodiment, all or some of operations to be executed by the electronic device 1401 may be executed at one or more of external electronic devices (e.g., the external electronic devices 1402 and 1404, and the server 1408). For example, if the electronic device 1401 needs to perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1401. The electronic device 1401 may provide the outcome, with or without further processing of the outcome, as at least part of a reply to the request. To that end, a cloud computing, distributed computing, mobile edge computing (MEC), or client-server computing technology may be used, for example. The electronic device 1401 may provide ultra-low-latency services using, e.g., distributed computing or MEC. In an embodiment, the external electronic device 1404 may include an IoT device. The server 1408 may be an intelligent server using machine learning and/or a neural network. According to an embodiment, the external electronic device 1404 or the server 1408 may be included in the second network 1499. The electronic device 1401 may be applied to intelligent services (e.g., a smart home, a smart city, a smart car, or healthcare) based on 5G communication technology or IoT-related technology.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of adjusting a volume of an electronic device, the method comprising:

based on a user's voice being input to a first electronic device, adjusting an output volume of a second electronic device, based on at least one of a second volume adjustment amount and a third volume adjustment amount, wherein the second volume adjustment amount is determined based on a relative difference between a volume of the input user's voice and a volume of the second electronic device measured in the first electronic device, and the third volume adjustment amount is input through a volume adjustment interface;

based on a conversation partner's voice being output from the first electronic device, adjusting an output volume of the first electronic device based on at least one of a first volume adjustment amount and the third volume adjustment amount, wherein the first volume adjustment amount is determined based on the volume of the second electronic device measured in the first electronic device; and, based on the user and the conversation partner speaking at the same time, adjusting the output volume of the second electronic device based on at least one of the first volume adjustment amount and the third volume adjustment amount and determining the output volume of the first electronic device based on the volume of the user's voice.

2. The method of claim 1, further comprising:

based on at least one of the user's speech and the conversation partner's speech ending, adjusting the output volume of the first electronic device or the output volume of the second electronic device to a volume before the output volume is adjusted.

3. The method of claim 1, wherein the volume adjustment interface comprises:

an output volume adjustment object of the first electronic device and an output volume adjustment object of the second electronic device.

4. The method of claim 1, wherein the volume adjustment interface comprises:

an object configured to display a volume before the output volume of the second electronic device is adjusted.

5. The method of claim 1, wherein the output volume of the second electronic device is adjusted in inverse proportion to the output volume of the first electronic device, or the output volume of the first electronic device is adjusted in inverse proportion to the output volume of the second electronic device.

6. The method of claim 1, further comprising:

based on the user's voice being input to the first electronic device, displaying at least one of a volume object and a first call object through a display of the first electronic device, wherein the volume object is configured to output the volume adjustment interface, and the first call object is configured to display that the user's voice is normally transmitted to the conversation partner.

7. The method of claim 1, further comprising:

based on the conversation partner's voice being output from the first electronic device, displaying at least one of a volume object, a second call object, and a third call object through a display of the first electronic device, wherein the volume object is configured to output the volume adjustment interface, the second call object is configured to display that the conversation partner is speaking, and the third call object is configured to display the conversation partner's voice in a text form.

8. The method of claim 1, further comprising:

based on the output volume of the second electronic device being adjusted, displaying an object configured to display that the output volume of the second electronic device is adjusted through a display of the second electronic device.

9. The method of claim 1, wherein the adjusting the output volume of the second electronic device comprises:

adjusting the output volume of the second electronic device based on a relative difference between the output volume of the second electronic device and the volume of the second electronic device that is measured in the first electronic device.

10. The method of claim 1, wherein the adjusting the output volume of the second electronic device based on the second volume adjustment amount comprises:

based on the volume of the input user's voice being less than a value obtained by adding a first specified volume to the volume of the second electronic device that is measured in the first electronic device, adjusting the output volume of the second electronic device such that the volume of the second electronic device measured in the first electronic device is less than a value obtained by subtracting the first specified volume from the volume of the input user's voice; and, based on the volume of the input user's voice being greater than the value obtained by adding the first specified volume to the volume of the second electronic device measured in the first electronic device, maintaining the output volume of the second electronic device.

11. The method of claim 1, wherein the adjusting the output volume of the second electronic device based on the second volume adjustment amount comprises:

based on the volume of the input user's voice being less than the volume of the second electronic device measured in the first electronic device, adjusting the output volume of the second electronic device such that the volume of the second electronic device measured in the first electronic device is less than a value obtained by subtracting a first specified volume from the volume of the input user's voice.

12. The method of claim 1, wherein the adjusting the output volume of the first electronic device based on the first volume adjustment amount comprises:

based on the volume of the second electronic device measured in the first electronic device exceeding a first reference volume, adjusting the output volume of the first electronic device to be the same as the volume of the second electronic device measured in the first electronic device;

based on the volume of the second electronic device measured in the first electronic device being less than or equal to the first reference volume and being greater than or equal to a second reference volume, adjusting the output volume of the first electronic device based on a value obtained by adding a second specified volume to the volume of the second electronic device measured in the first electronic device; and, based on the volume of the second electronic device measured in the first electronic device being less than the second reference volume, adjusting the output volume of the first electronic device based on the second reference volume and the second specified volume.

13. The method of claim 1, wherein the determining the first electronic device based on the volume of the user's voice comprises:

determining the output volume of the first electronic device corresponding to the volume of the conversation partner's voice to be the same as the volume of the user's voice.

14. The method of claim 1, wherein the adjusting the output volume of the first electronic device comprises:

adjusting an output volume level of the first electronic device, based on the first volume adjustment amount and first mapping information between the output volume of the first electronic device and a first volume level, and the adjusting the output volume of the second electronic device comprises:

adjusting an output volume level of the second electronic device, based on the second volume adjustment amount and second mapping information between the output volume of the second electronic device and a second volume level.

15. A non-transitory computer-readable storage medium storing instructions that, when executed by at least one processor, comprising processing circuitry, individually and/or collectively, cause an electronic device to perform the method of claim 1.

16. A device for adjusting a volume of an electronic device, the device comprising:

at least one processor, comprising processing circuitry; and memory for storing instructions that, when executed by the at least one processor individually or collectively, cause the device to:

based on a user's voice being input to a first electronic device, adjust an output volume of a second electronic device, based on at least one of a second volume adjustment amount and a third volume adjustment amount, wherein the second volume adjustment amount is determined based on a relative difference between a volume of the input user's voice and a volume of the second electronic device measured in the first electronic device, and the third volume adjustment amount input through a volume adjustment interface, based on a conversation partner's voice being output from the first electronic device, adjust an output volume of the first electronic device based on at least one of a first volume adjustment amount and the third volume adjustment amount, wherein the first volume adjustment amount is determined based on the volume of the second electronic device measured in the first electronic device, and, based on the user and the conversation partner speaking at the same time, adjust the output volume of the second electronic device based on at least one of the first volume adjustment amount and the third volume adjustment amount and determining the output volume of the first electronic device based on the volume of the user's voice.

* * * * *